United States Patent
Xiao et al.

(10) Patent No.: US 10,106,153 B1
(45) Date of Patent: Oct. 23, 2018

(54) MULTI-NETWORK-BASED PATH GENERATION FOR VEHICLE PARKING

(71) Applicant: SF Motors, Inc., Santa Clara, CA (US)

(72) Inventors: Xinhua Xiao, Santa Clara, CA (US); Yifan Tang, Santa Clara, CA (US)

(73) Assignees: Chongqing Jinkang New Energy Vehicle Co., Ltd., Chongqing (CN); SF Motors, Inc., Santa Clara, CA (US)

( * ) Notice: Subject to any disclaimer, the term of this patent is extended or adjusted under 35 U.S.C. 154(b) by 0 days.

(21) Appl. No.: 16/004,051

(22) Filed: Jun. 8, 2018

Related U.S. Application Data

(63) Continuation of application No. 15/934,870, filed on Mar. 23, 2018.

(51) Int. Cl.
| B60W 30/06 | (2006.01) |
| G06K 9/00 | (2006.01) |
| G06N 3/04 | (2006.01) |
| G05D 1/02 | (2006.01) |

(52) U.S. Cl.
CPC .......... *B60W 30/06* (2013.01); *G05D 1/0278* (2013.01); *G06K 9/00805* (2013.01); *G06N 3/0454* (2013.01); B60W 2530/14 (2013.01); B60W 2550/10 (2013.01)

(58) Field of Classification Search
CPC . B60W 30/06; G05D 1/0278; G06K 9/00805; G06N 3/0454
See application file for complete search history.

(56) References Cited

U.S. PATENT DOCUMENTS

| 5,742,141 A * | 4/1998 | Czekaj | B62D 15/028 |
| | | | 180/167 |
| 9,429,943 B2 * | 8/2016 | Wilson | G05D 1/0246 |
| 9,969,385 B2 * | 5/2018 | Jecker | B62D 15/027 |
| 10,040,482 B1 * | 8/2018 | Jung | B62D 15/0285 |
| 2007/0282503 A1 * | 12/2007 | Luke | B62D 15/027 |
| | | | 701/44 |

(Continued)

OTHER PUBLICATIONS

Gao, Wei et al. "Intention-Net: Integrating Planning and Deep Learning for Goal-Directed Autonomous Navigation", First Conference on Robot Learning (CoRL 2017), Mountain View, U.S.

(Continued)

*Primary Examiner* — Calvin Cheung
(74) *Attorney, Agent, or Firm* — Foley & Lardner LLP; James De Vellis

(57) ABSTRACT

Systems and methods of deep neural network based parking assistance is provided. A system can receive data sensed by one or more sensors mounted on a vehicle located at a parking zone. The system generates, from a first neural network, a digital map based on the data sensed by the one or more sensors. The system generates, from a second neural network, a first path based on the three-dimensional dynamic map. The system receives vehicle dynamics information from a second one or more sensors located on the vehicle. The system generates, with a third neural network, a second path to park the vehicle based on the first path, vehicle dynamics information and at least one historical path stored in vehicle memory. The system provides commands to control the vehicle to follow the second path to park the vehicle in the parking zone.

20 Claims, 7 Drawing Sheets

(56) References Cited

U.S. PATENT DOCUMENTS

| | | | |
|---|---|---|---|
| 2013/0046441 A1* | 2/2013 | Marczok | B60Q 9/005 |
| | | | 701/36 |
| 2014/0046506 A1* | 2/2014 | Reichel | B62D 15/0285 |
| | | | 701/2 |
| 2015/0244028 A1 | 12/2015 | Gieseke et al. | |
| 2016/0005229 A1* | 1/2016 | Lee | G06F 3/0488 |
| | | | 345/419 |
| 2017/0015312 A1* | 1/2017 | Latotzki | B60W 30/06 |
| 2017/0017848 A1 | 1/2017 | Gupta et al. | |
| 2017/0229020 A1* | 8/2017 | Colella | B60K 35/00 |
| 2017/0232890 A1* | 8/2017 | Lewis | G06T 7/13 |
| | | | 348/148 |
| 2018/0009477 A1* | 1/2018 | Pla Rubio | B62D 15/0285 |
| 2018/0101739 A1* | 4/2018 | Zhang | G06K 9/4671 |
| 2018/0120851 A1* | 5/2018 | Shin | G05D 1/024 |
| 2018/0120853 A1* | 5/2018 | Seo | B60W 30/06 |
| 2018/0162384 A1* | 6/2018 | Kim | B60W 30/06 |
| 2018/0164830 A1* | 6/2018 | Moosaei | B60W 30/06 |

OTHER PUBLICATIONS

Huang, Siyu et al. "Deep Learning Driven Visual Path Prediction from a Single Image", IEEE Transactions on Image Processing, 25:12(5892-5904, Dec. 2016.

Kokkinos, Iasonas. "UberNet: Training a 'Universal' Convolutional Neural Network for Low-, Mid-, and High-Level Vision using Diverse Datasets and Limited Memory", Computer Vision and Pattern Recognition (CVPR), 2017 EEE Conference, Jul. 21-26, 2016, Honolulu, HI.

Park Assist—Really Smart Parking, https://www.parkassist.com/solutions/, retrieved Mar. 26, 2018.

Parking Assistance: IP Landscape Report, Relecura Inc., 2018.

Yang, Schichao et al. "Obstacle Avoidance through Deep Networks based Intermediate Perception", arXiv preprint arXiv:1704.08759, Apr. 27, 2017.

* cited by examiner

MULTI-NETWORK-BASED PATH GENERATION FOR VEHICLE PARKING

CROSS-REFERENCES TO RELATED APPLICATIONS

This application claims the benefit of priority under 35 U.S.C. § 120 as a continuation of U.S. patent application Ser. No. 15/934,870, filed Mar. 23, 2018, which is hereby incorporated by reference herein in its entirety.

BACKGROUND

Vehicles such as automobiles can include mechanisms to gather information related to vehicle operation or to the environment of the vehicle. This information can indicate a status of the vehicle or environment conditions for autonomous driving or assisted driving.

SUMMARY

The present disclosure is directed to systems and methods of multi-network-based path generation for a vehicle controller. Vehicles with autonomous driving or driver assistant features can use computer vision technology to provide parking assistance. Parking assist systems can help drivers park their vehicles in parking spaces. Parking assist systems can include parking sensors, rear-facing cameras, 360-degree cameras, intelligent parking assist systems, and fully automated parking assist systems. Information from surveillance cameras can be used for planning the path the vehicle traverse to enter the parking space. However, using surveillance camera information and computer vision to generate paths can result in the generation of multiple or excessive paths, or the repeated generation of paths. Generating excessive paths or repeatedly generating paths to park or otherwise direct a vehicle can cause excessive resource utilization, such as computing resource utilization, processor utilization, bandwidth utilization, or memory utilization. Further, repeatedly adjusting or controlling the vehicle based on subsequently detected obstacles or objects, or subsequently generated paths can result in excessive controlling of the vehicle, such as steering, braking, or acceleration. Thus, it may be challenging or inefficient for autonomous vehicles or assisted vehicles to plan a path and park in a parking lot using computer vision or imaging.

Systems and methods of the present technical solution provide for multi-network-based path generation for a vehicle controller, in accordance with an embodiment. The present technology provides a unified multi-task network by utilizing on-vehicle sensors for parking assistance which generates a path based on semantic scene segmentation, object detection, global positioning system ("GPS") maps and vehicle dynamics. The present technology may not use or rely on surveillance camera information, and can provide independent sensing and path planning based on the sensors on the vehicles. By utilizing a unified multi-task network For example, a data processing system of the present technical solution can use multiple neural networks to provide vehicular parking control or assistance. The data processing system can provide technical improvements by combining GPS maps and deep learning intermediate perception to generate a dynamic map. The data processing system can generate the dynamic map from a fusion of depth, object/obstacle detection, and road information. The data processing system can incorporate vehicle dynamics (e.g., orientation, etc.) to generate a path for the vehicle to follow. The data processing system can use both computer vision technologies and multiple deep neural networks to detect parking lines or markers in a parking lot or zone more accurately, and decide if the parking spot is available or not. The data processing system can generate paths in the absence of parking lines or markers by using only deep learning. The data processing system can generate paths in the absence of GPS connectivity, such as in a parking garage (e.g., underground parking garage or closed parking garage). The data processing system can provide for entering or exiting the parking lot.

At least one aspect is directed to a system of network-based path generation for a vehicle controller. The system can include a data processing system. The data processing system can include one or more processors and memory. The data processing system can include a mapping engine component, a path generation component, and a controller component. The data processing system can receive data sensed by one or more sensors mounted on a vehicle located at a parking zone. The data processing system can generate, from a first neural network tuned to process sensor input, a digital map data structure based on the data sensed by the one or more sensors. The data processing system can generate, from a second neural network tuned to process digital map data structures, a first path based on the three-dimensional dynamic map. The data processing system can receive vehicle dynamics information from a second one or more sensors located on the vehicle. The data processing system can generate, with a third neural network tuned to process vehicle dynamics and paths, a second path to park the vehicle based on the first path, vehicle dynamics information and at least one historical path stored in vehicle memory. The data processing system can provide commands to control the vehicle to follow the second path to park the vehicle in the parking lot.

At least one aspect is directed to a method of multiple neural network-based vehicular parking control. The method can be performed by a data processing system having one or more processors and memory. The method can include the data processing system receiving data sensed by one or more sensors mounted on a vehicle located at a parking zone. The method can include the data processing system generating, from a first neural network tuned to process sensor input, a digital map data structure based on the data sensed by the one or more sensors. The method can include the data processing system generating, from a second neural network tuned to process digital map data structures, a first path based on the three-dimensional dynamic map. The method can include the data processing system receiving vehicle dynamics information from a second one or more sensors located on the vehicle. The method can include the data processing system generating, with a third neural network tuned to process vehicle dynamics and paths, a second path to park the vehicle based on the first path, vehicle dynamics information and at least one historical path stored in vehicle memory. The method can include the data processing system providing commands to control the vehicle to follow the second path to park the vehicle in the parking lot.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
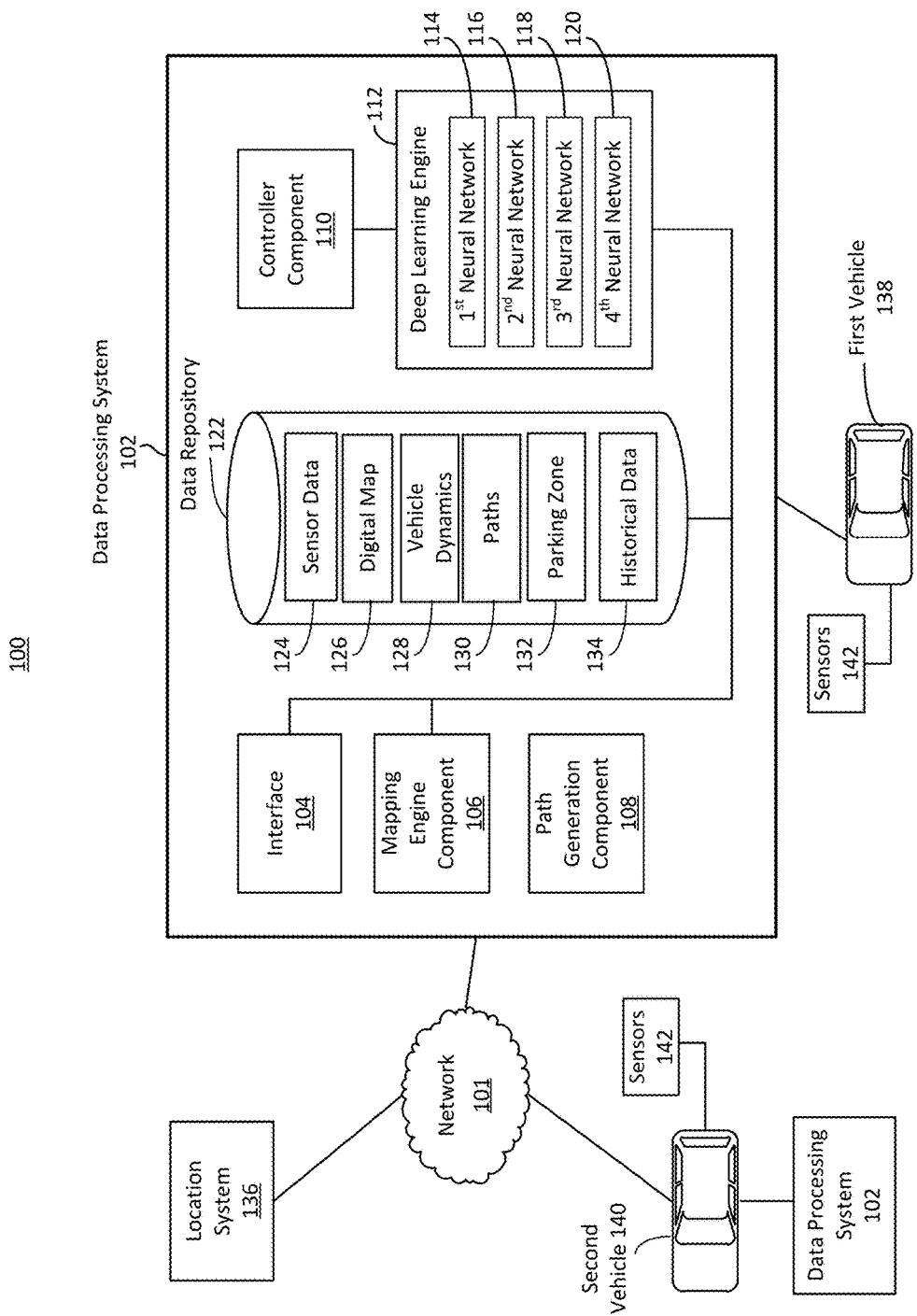
FIG. 1 depicts a block diagram depicting an example system of network-based path generation for a vehicle controller, in accordance with an embodiment.

Following below are more detailed descriptions of various concepts related to, and implementations of, methods, apparatuses, and systems of network-based path generation for a vehicle controller. The various concepts introduced above and discussed in greater detail below may be implemented in any of numerous ways.

The present disclosure is directed to systems and methods of network-based path generation for a vehicle controller, in accordance with an embodiment. Vehicles with autonomous driving or driver assistant features can use computer vision technology to provide parking assistance. Parking assist systems can help drivers park their vehicles in parking spaces. Parking assist systems can include parking sensors, rear-facing cameras, 360-degree cameras, intelligent parking assist systems, and fully automated parking assist systems. Information from surveillance cameras can be used for planning the path the vehicle traverse to enter the parking space. However, using surveillance camera information and computer vision to generate paths can result in the generation of multiple or excessive paths, or the repeated generation of paths. Generating excessive paths or repeatedly generating paths to park or otherwise direct a vehicle can cause excessive resource utilization, such as computing resource utilization, processor utilization, bandwidth utilization, or memory utilization. Further, repeatedly adjusting or controlling the vehicle based on subsequently generated paths can result in excessive controlling of the vehicle, such as steering, braking, or acceleration. Thus, it may be challenging or inefficient for autonomous vehicles or assisted vehicles to plan a path and park in a parking lot using computer vision or imaging.

The disclosed solutions have a technical advantage relative to at least systems that use only computer vision or surveillance information to perform parking assistance. For example, computer vision systems may rely on parking lines to identify parking spaces and determine whether the parking space is available. As such, parking assistance systems that rely on imaging may be unable to perform parking assistance in a parking lot lacking parking lines or markers. Further, such parking assistance systems may rely on GPS information to locate the vehicle in the parking zone and plan the path, which may preclude such systems from performing parking assistances in GPS denied areas, such as in a parking garage. Further, parking assistance systems that rely on computer vision or GPS may generate excessive parking paths or repeatedly generate parking paths as new sensor information is collected, thereby using excessive computing resources.

Systems and methods of the present technical solution provide for deep neural network based parking assistance. The disclosed solutions have a technical advantage relative to parking assistance systems that rely on computer vision, surveillance images, or GPS coordinates. The disclosed solutions can also provide a technical advantage relative to human-operated parking. For example, human drivers rely on sight (in some respects similar to the computer vision or imaging technology), to determine the available parking spaces based on parking lines and the presence of other vehicles, and is similarly subject to constraints under poor visibility conditions. Hand, facial or body gestures or cues to signal intentions between human operators can be limited or impossible under poor visibility conditions such as at night or during poor weather. Furthermore, such cues and gestures often appear ambiguous, or are often conveyed unsuccessfully or inefficiently due to other drivers' inattentiveness, distance or limited visibility.

The present technology provides a unified multi-task network by utilizing on-vehicle sensors for parking assistance which generates a path based on semantic scene segmentation, object detection, global positioning system ("GPS") maps and vehicle dynamics. For example, a data processing system of the present technical solution can use multiple neural networks to provide vehicular parking control or assistance. The data processing system can provide technical improvements by combining GPS maps and deep learning intermediate perception to generate a dynamic map. The data processing system can generate the dynamic map from a fusion of depth, object/obstacle detection, and road information. The data processing system can incorporate vehicle dynamics (e.g., orientation, etc.) to generate a path for the vehicle to follow. The data processing system can use both computer vision technologies and multiple deep neural networks to detect parking lines or markers in a parking lot or zone more accurately, and decide if the parking spot is available or not. The data processing system can generate paths in the absence of parking lines or markers by using only deep learning. The data processing system can generate paths in the absence of GPS connectivity, such as in a parking garage. The data processing system can provide for entering or exiting the parking lot.

The disclosed system and methods can be incorporated into self-driving advanced driving assistance systems, in vehicles such gas powered vehicles, hybrid vehicles, electric vehicles (EVs) or autonomous driving vehicles. Vehicles can include automobiles, cars, motorcycles, scooters, passenger vehicles, passenger or commercial trucks, and other vehicles such as sea or air transport vehicles, planes, helicopters, submarines, boats, or drones. Vehicles can be fully autonomous, partially autonomous, or unmanned. Fully autonomous, partially autonomous or unmanned vehicles can include non-electric vehicles such as vehicles based on combustion engines or non-electric engines.

FIG. 1 depicts a block diagram depicting an example system for neural network-based vehicular parking control. The system 100 can include at least one data processing system 102 for use in path generation and vehicle control to facilitate parking. The data processing system 102 can include at least one interface 104, at least one mapping engine component 106, at least one path generation component 108, at least one controller component 110, at least deep learning engine 112, and at least one data repository 122. The data processing system 102 can include hardware or a combination of hardware and software, such as communications buses, circuitry, processors, communications interfaces, among others. The data processing system 102 can reside on or within a corresponding vehicle (e.g., a host vehicle). For example, FIG. 1 shows a first vehicle 138 with a data processing system 102 on-board, and a second vehicle 140 with another or similar data processing system 102 on-board. Each of the first vehicle 138 and the second vehicle 140 (or their corresponding data processing system 102) can be communicatively connected to a network 101 to each other or to one or more other systems (e.g., a global positioning system, or to one or more communications devices).

The data repository 122 can include or store a sensor data structure 124, a digital map data structure 126, a vehicle dynamics data structure 128, a paths data structure 130, a parking zone data structure 132, or historical data data structure 134. The sensor data structure 124 can include information about available sensors, identifying information for the sensors, address information, internet protocol information, unique identifiers, data format, protocol used to communicate with the sensors, or a mapping of information type to sensor type or identifier. The sensor data structure 124 can further include or store information collected by sensors 142. The sensor data structure 124 can store sensor data using timestamps and date stamps. The sensor data structure 124 can store sensor data using location stamps. The sensor data structure 124 can categorize the sensor data based on a parking zone or characteristic of a parking zone.

The digital map data structure 126 can include, store, or maintain digital map data used to generate a path. The digital map data structure 126 can include or store one or more digital map data. The digital map data structure 126 can categorize the digital map data based on a parking zone or characteristic of a parking zone. The digital map data structure 126 can be updated or manipulated by the data processing system 102.

The vehicle dynamics data structure 128 can include or store vehicle dynamics information collected by one or more sensors. The vehicle dynamics data structure 128 can include or store predetermined, preset, or preconfigured vehicle dynamics information, such as a dimension of the car which may be preset or stored by an administrator of the data processing system 102, manufacturer of the data processing system 102 or manufacturer or administrator of the vehicle 138.

The paths data structure 130 can include or store one or more paths that facilitate parking assistance. The paths data structure 130 can include historical paths, or store candidate paths or intermediately generated paths. The paths data structure 130 can store a final path. The paths data structure 130 can include one or more historical paths. Paths can be stored as path data that can indicate coordinates, direction, velocity, angles, arcs, curves, a path function, or multiple path segments combined to form a single path.

The parking zone data structure 132 can include or store information about the parking zone. The parking zone data structure can include or store information about multiple parking zones. The parking zone data structure can include or store information categorized based on a type of parking zone or type of entity with which a parking zone may be associated (e.g., grocery store parking lot, underground garage, or above ground covered garage).

The historical data structure 134 can include or store historical data such as information about historical paths, training sets used to train or tune neural networks, user preferences, prior parking paths, or prior parking zone information. Tuning a neural network can refer to or include a process of machine learning in which training data sets including historical data are provided to the neural network for processing. Tuning can refer to or include training or processing of the neural network to allow the neural network to improve accuracy. Tuning the neural network can include, for example, designing the neural network using architectures for that have proven to be successful for the type of problem or objective desired for the neural network (e.g., first neural network 114, second neural network 116, third neural network 118 or fourth neural network 120). In some cases, the one or more neural networks may initiate at a same or similar baseline model, but during the tuning (or training or learning process), the result neural networks can be sufficiently different such that each neural network can be tuned to process a specific type of input and generate a specific type of output with a higher level of accuracy and reliability as compared to a different neural network that is either at the baseline model or tuned or trained for a different objective or purpose. Tuning the neural network can include setting different parameters for each network, fine-tuning parameters differently for each neural network, or assigning different weights (e.g., hyperparameters, or learning rates), tensor flows. Thus, by setting different parameters for each the neural networks based on a tuning or training process and the objective of the neural network, the data processing system can improve performance of the overall path generation process.

Each of the components of the data processing system 102 can be implemented using hardware or a combination of software and hardware. Each component of the data processing system 102 can include logical circuitry (e.g., a central processing unit or CPU) that responses to and processes instructions fetched from a memory unit (e.g., memory 715 or storage device 725). Each component of the data processing system 102 can include or use a microprocessor or a multi-core processor. A multi-core processor can include two or more processing units on a single computing component. Each component of the data processing system 102 can be based on any of these processors, or any other processor capable of operating as described herein. Each processor can utilize instruction level parallelism, thread level parallelism, different levels of cache, etc. For example, the data processing system 102 can include at least one logic device such as a computing device or server having at least one processor to communicate via the network 101. A data processing system 102 of the first vehicle 138 can communicate with a different data processing system 102 that is associated with or part of a second vehicle 102.

The network 101 can include computer networks such as the internet, local, wide, near field communication, metro or other area networks, as well as satellite networks or other computer networks such as voice or data mobile phone communications networks, and combinations thereof. The network 101 can include or constitute an inter-vehicle communications network, e.g., a subset of components including the data processing system 102 and components thereof for inter-vehicle data transfer. The network 101 can include a point-to-point network, broadcast network, telecommunications network, asynchronous transfer mode network, synchronous optical network, or a synchronous digital hierarchy network, for example. The network 101 can include at least one wireless link such as an infrared channel or satellite band. The topology of the network 101 can include a bus, star, or ring network topology. The network 101 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The components and elements of the data processing system 102 can be separate components, a single component, or part of the data processing system 102. For example, the interface 104, mapping engine component 106, path generation component 108, controller component 110 or deep learning engine 112 (and the other elements of the data processing system 102) can include combinations of hardware and software, such as one or more processors configured to initiate stop commands, initiate motion commands, and transmit or receive timing data, for example.

The components of the data processing system 102 can be hosted on or within a single vehicle, such as a first vehicle 138. However, some components of the data processing system 102 (e.g., historical data 134 of data repository 122) can reside outside of the vehicle, and be in communication with the vehicle for at least a certain time period. For example, portions of data illustrated on the data repository 122 can reside on a remote server, such as in a cloud of servers, that maintains the historical data 134, and can be accessed by the data processing system 102 (e.g., through network 101) at times when the historical data 134 is obtained to generate a path or train a neural network. The components of the data processing system 102 can be connected or communicatively coupled to one another. The connection between the various components of the data processing system 102 can be wired or wireless, or any combination thereof. Counterpart systems or components can be hosted on other vehicles to enable communication or coordination between vehicles.

The system 100 can include one or more sensors 142. The sensors 142 can be coupled to or associated with a vehicle, such as a first vehicle 138. In some cases, the data processing system 102 can include the sensors 138. The sensors 138 can provide information to the data processing system 102. The data processing system 102 can interface with the sensors 142 via interface 104. The sensors 142 can be part of the vehicle 138, or remote from the vehicle 138. The data processing system 102 can collect data from a first one or more sensors that include one or more different types of sensors 142. The first one or more sensors can include, for example, a radar sensor, lidar sensor, and camera. The data processing system 102 can collect vehicle dynamics information from a second one or more sensors, such as orientation data, velocity, or weight.

Sensors 142 can include one or more sensing elements or transducers that captures, acquires, records or converts information about its host vehicle or the host vehicle's environment into a form for processing. The sensor 142 can acquire or detect information about parking lots or parking zones. The sensor 142 can detect a parking zone condition such as a road feature, boundary, intersection, lane, or other condition. The sensor 142 can for example acquire one or more images of the parking zone, which can be processed using image processing and object recognition to identify or detect features indicative of a parking zone, e.g., a parking sign, a stop sign or surface markings on a parking zone. For instance, the sensor 142 can acquire one or more images or recordings (e.g., photographic, radar, ultrasonic, millimeter wave, infra-red, ultra-violet, light detection and ranging or lidar, or audio, or video). The sensor 142 can communicate sensed data, images or recording to the data processing system 102 for processing, which can include filtering, noise reduction, image enhancement, etc., followed by object recognition or feature detection.

The sensor 142 can include a camera as well as one or more sensors of one or more types. For example, the sensor 142 can include a Radar, light detection and ranging (LIDAR), ultrasonic, or vehicle-to-everything (V2X) (e.g., vehicle-to-vehicle (V2V), V2I, vehicle-to-device (V2D), or vehicle-to-passenger (V2P)) sensor. For example, a part of the parking zone can be installed with a radio-frequency identification (RFID) or other marker, beacon, or indicator (e.g., on or within a stop sign, pavement, traffic light, or other dedicated structure), which can provide visual or other characteristics (e.g., electromagnetic, audio or other emissions). The data processing system, interoperating with the sensor 142, can capture, sense, detect or recognize such characteristics, so that the data processing system 102 can determine that the intersection is present or approaching relative to the motion of a host vehicle.

The sensor 142 can include a global positioning system (GPS) device that can determine a location of the host vehicle relative to an intersection, using map data with an indication of the parking zone. The data processing system 102 can use the GPS device and the map data to determine that the host vehicle (e.g., first vehicle 138) has reached the parking zone. The data processing system 102 can use the GPS device and the map data to determine the boundaries of the parking zone. The sensor 142 can also detect (e.g., using motion sensing, imaging or any of the other sensing capabilities described herein) whether any other vehicle or object is present at or approaching the parking zone, and can track any such vehicle or object's position or movement over time for instance.

The data processing system 102 can interface or communicate with a location system 136 via network 101. The location system 136 can include any device based on a positioning system such as Global Navigation Satellite System (GNSS), which can include GPS, GLONASS, Galileo, Beidou and other regional systems. The location system 136 can include one or more cellular towers to provide triangulation. The location system 136 can include wireless beacons, such as near field communication beacons, short-range wireless beacons (e.g., Bluetooth beacons), or Wi-Fi modules. The data processing system 102 (e.g., mapping engine component 106) can include or interface with a device, component, antenna, or other module or element to determine a location of the vehicle 138 via the location system 136.

The disclosed system and methods can provide improved parking assistance using one or more neural networks. Although the disclosure can sometimes refer to parking vehicles in a parking lot, this is by way of illustration and not intended to be limiting in any way. For example, other parking zones, for waterways, airways, in space or otherwise, that can involve path generation and vehicular control, are included.

Figure 3:
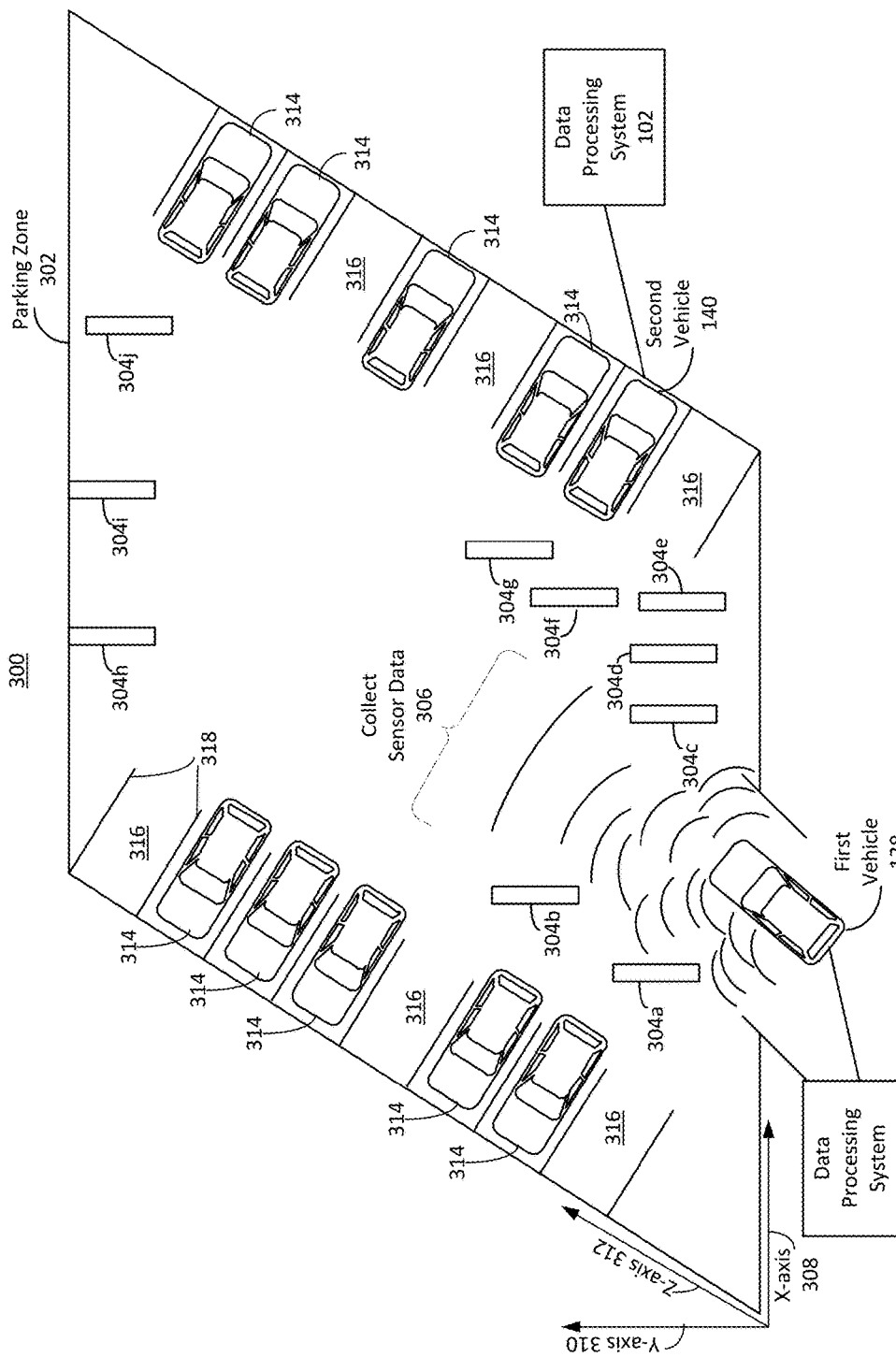
FIG. 3 depicts an example of network-based path generation for a vehicle controller, in accordance with an embodiment.

A parking zone can include a physical area that is established for parking, storing, or keeping a vehicle for a period of time (e.g., parking zone 302 depicted in FIG. 3). The parking zone can be a private parking zone or public parking zone. For example, the parking zone can be established by a municipality, such as a town, city, state, or country. The parking zone can be a private parking zone established by an individual on private property. The parking zone can be a private parking zone established by an organization, company, business, or other entity on private property. the parking zone can be a free parking lot, or a paid parking lot. The parking zone can be open, fully enclosed (e.g., underground parking garage or parking garage with a garage door), or partially enclosed (e.g., a parking garage without a garage door). The parking zone can be predetermined or pre-established. In some cases, the parking zone can be an ad-hoc parking zone that is created for an event or circumstance on a temporary basis.

The parking zone can include one or more parking spots. The parking zone can include one or more markers, lines, signs, or other indications to facilitate parking or define aspects of the parking zone. For example, the parking zone may or may not include parking lines that define or allocate a physical area or space in which a vehicle is to park. The parking lot can include signs that provide parking restrictions, such as types of vehicles that can park in a parking space or spot (e.g., small vehicle, mid-size vehicle, full size vehicle, sports utility vehicle, truck, hybrid, electric vehicle), requirements (e.g., handicap sticker), or time constraints (e.g., 1 hour parking, 2 hour parking).

The data processing system 102 can include an interface 104. The data processing system 102 can include an interface 102 designed, configured, constructed, or operational to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 142 to collect or receive information. The interface 104 can be designed, constructed or operational to communicate with one or more controller components 110 to provide commands or instructions to control a vehicle, such as the first vehicle 138.

The interface 104 can receive data sensed by one or more sensors 142 mounted on the first vehicle 138. The first vehicle 138 can be located at or proximate to a parking zone, parking area, parking lot, parking garage, driveway with parking spaces, or road with parking spaces. The sensed data received from the one or more sensors 142 can include data detected, obtained, sensed, collected, or otherwise identified by the one or more sensors 142. The sensed data can include, for example, data from one or more sensors 142 such as a camera, infrared camera, image sensor, LIDAR, laser based sensor, radar, transducer, or ultrasonic transducer. Cameras can include, for example, forward facing cameras, rear cameras, 360 degree cameras, stereo or mono cameras, two-dimensional cameras or three-dimensional cameras. For three-dimensional cameras, the sensors 142 can multiple cameras (e.g., three, four, five, six or more) that provide input to the data processing system 102 via interface 104 to generate a three-dimensional image. The cameras can have a high dynamic range, such as 130 dB, 135 dB, 140 dB, 145 dB, or more. The cameras can be digital cameras.

The data processing system 102 can receive, obtain or collected sensed data from sensors 142 that include forward facing cameras. Forward facing cameras can include camera systems configured for medium to high ranges, such as in the area between 100 and 275 yards. Medium range cameras essentially warn the driver about cross-traffic, pedestrians, emergency braking in the car ahead, as well as lane and signal light detection. High range cameras are used for traffic sign recognition, video-based distance control, and road guidance. A difference between cameras for medium and high range can be the aperture angle of the lenses or field of view. For medium range systems, a horizontal field of view of 70° to 120° can be used, whereas cameras with a wide range of apertures can use horizontal angles of approximately 35°. The cameras or other optical sensors can provide the raw data of the image sensors to the data processing system 102 for further processing. Sensors 142 can also include cameras with wide angle cameras (or short range cameras), with a horizontal field of view up to 190 or 200 degrees, which can detect the road and parking line more clearly relative to non-wide angle cameras or long-range cameras with may not be able to detect parking lines as clearly.

The data processing system 102 can receive, obtain or collect sensed data from a radar (or Radio Detection And Ranging), which can refer to the detection and localization of objects using radio waves. The radar can transmit signal within a frequency range. The radar can transmit signals with a center frequency. The radar can transmit signals that include an up-chirp or down-chirp. The radar can transmit bursts. For example, the radar can be based on 24 GHz or 77 GHz. The 77 GHZ radar can provide higher accuracy for distance and speed measurements as well as more precise angular resolution, relative to the 24 GHz radar. The 77 GHz can utilize a smaller antenna size and may have lower interference problems as compared to a radar configured for 24 GHz. The radar can be a short-range radar ("SRR"), mid-range radar ("MRR") or long-range radar ("LRR"). SRR radars can be configured for blind spot detection, blind spot monitoring, lane and lane-change assistance, rear end radar for collision warning or collision avoidance, park assist, or cross-traffic monitoring.

The SSR sensor can complement or replace ultrasonic sensors. SRR sensors can be placed at each corner of the vehicle 138, and a forward-looking sensor for long range detection can be positioned on the front of the vehicle 138. Extra sensors are placed on each side mid-body of the vehicle 138. SRR sensors can include radar sensors that use the 79-GHz frequency band with a 4-GHZ bandwidth, or 1 GHZ bandwidth at 77 GHz, for example. The radar sensor can include or utilize a monolithic microwave integrated circuit ("MMIC") having, for example, three transmission channels (TX) and four receive channel (RX) to be monolithically integrated. The radar can provide raw data or pre-processed data to the data processing system 102. For example, the radar sensor can provide pre-process information on speed, distance, signal strength, horizontal angle, and vertical angle for each detected object. The raw data radar sensor can provide unfiltered raw data to the data processing system 102 for processing.

The data processing system 102 can receive, collect, obtain or otherwise identify sensed data from a sensor 142 such as a LIDAR sensor. A LIDAR sensor can refer to or include a laser-based system. In addition to the transmitter (laser), the LIDAR sensor system can use a sensitive receiver. The LIDAR sensor can measure distances to stationary as well as moving objects. The LIDAR sensor system can provide three-dimensional images of the detected objects. LIDAR sensors can be configured to provide 360 degree all-round visibility that capture spatial images of objects. LIDAR sensors can include infrared LIDAR systems that use Micro-Electro-Mechanical System ("MEMS"), a rotating laser, or a solid-state LIDAR. The LIDAR sensors can recognize light beams emitted as well as reflected from objects. For example, the LIDAR sensors can use detectors that are configured to measure single photons, such as a Single-Photon Avalanche Diode ("SPAD").

The one or more sensors 142, individually or combined, can provide sensed data that allows for parking assistance under various environmental conditions (temperature, solar radiation, darkness, rain, snow). The data processing system 102 can used the sensed data to detect objects, classify the objects, and determine the distance from them. For example, the cameras can identify pedestrians and cyclists, motor vehicles, parking lines, parking markers, parking signs, curbs, trees, roads, terrain, obstacles, side strips, bridge abutments, and road margins. The algorithms are also used to detect traffic signs and signals.

The data processing system 102 can include a mapping engine component 106 designed, constructed or operational to generate a digital map data structure based on the data sensed by the one or more sensors 142. The digital map data structure can refer to data that may or may not be rendered for display. The digital map data structure (or referred to as digital map) can include data that can be accessed, parsed or processed by the data processing system 102 for path generation. The mapping engine component 106 can generate the digital map data structure from, with or using a deep learning engine 112. The mapping engine component 106 can generate the digital map from, with or using a first neural network 114 established, maintained, tuned, or otherwise provided via the deep learning engine 112. The deep learning engine 112, or first neural network 114, can be configured, stored, or established on the data processing system 102 of the first vehicle 138. The mapping engine component 106 can detect, from the first neural network 114 and based on the data sensed by the one or more sensors 142, objects located at the parking lot. The mapping engine component 106 can perform, using the first neural network 114 and based on the data sensed by the one or more sensors 142, scene segmentation. The mapping engine component 106 can determine, using the first neural network 114 and based on the data sensed by the one or more sensors 142, depth information for the parking zone. The mapping engine component 106 can identify, from the first neural network 114 and based on the data sensed by the one or more sensors, one or more parking lines at the parking zone. The mapping engine component 106 can construct the digital map based on the detected objects located at the parking zone, the scene segmentation, the depth information for the parking zone, and the one or more parking lines at the parking zone.

The mapping engine component 106 can use a first neural network 114 (or $1^{st}$ neural network) to generate the digital map data structure. The first neural network 114 can be tuned, trained, or otherwise configured to receive data sensed by a first one or more sensors 142 as input, and output a digital map. The first neural network 114 can be tuned, trained or otherwise configured to receive raw sensor data from the first one or more sensors 142 as input. The first neural network 114 can be tuned, trained or otherwise configured to receive pre-processed data, filtered data, or data that is otherwise manipulated to facilitate being processed via the first neural network 114 to output the digital map. For example, certain types of sensed data can be pre-processed by the mapping engine component 106 or the a system associated with the sensor 142 itself.

The first neural network 114 can include any type of neural network including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, etc.

The deep learning engine 112 can maintain, manage, store, update, tune, or configure the one or more neural networks 114, 116, 118, and 120. The deep learning engine 112 can use different parameters, weights, training sets, or configurations for each of the neural networks 114, 116, 118, and 120 to allow the neural networks to efficiently and accurately process a type of input and generate a type of output. By separately configuring and tuning each of the neural networks 114, 116, 118 and 120, the data processing system 102 can improve the efficiency, reliability and accuracy with which parking paths are generated relative to using a same neural network or not using a neural network, since each of the different neural networks can be trained and tuned to process a specific input and generate a specific output to facilitate the parking path generation data flow.

For example, the first neural network 114 can be configured as or include a convolution neural network. The convolution neural network can include one or more convolution cells (or pooling layers) and kernels, that can each serve a different purpose. The convolution kernel can process input data, and the pooling layers can simplify the data, using, for example, non-linear functions such as a max, thereby reducing unnecessary features. The first neural network 114 including the convolution neural network can facilitate image recognition. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

The first neural network 114 can include a convolution neural network designed and constructed to have an input layer and an output layer. The first neural network 114 can also have one or more hidden layers that can include convolution layers, pooling layers, fully connected layers, or normalization layers. For example, in a convolution layers, the data processing system 102 can apply a convolution operation to the input, passing the result to the next layer. The convolution emulates the response of an individual neuron to visual stimuli. Each convolutional neuron processes data only for its receptive field. Using the convolution operation can reduce the number of neurons used in the neural network as compared to a fully connected feedforward neural network. Thus, the convolution operation brings a technical solution to this problem as it reduces the number of free parameters, allowing the network to be deeper with fewer parameters. For example, regardless of image size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The first neural network 114 configured with a convolution neural network can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The first neural network 114 configured with a convolution neural network can include fully connected layers. Fully connected layers can connect every neuron in one layer to every neuron in another layer. The first neural network 114 configured with a convolution neural network can be configured with shared weights in convolutional layers, which can refer to the same filter being used for each receptive field in the layer, thereby reducing a memory footprint and improving performance of the first neural network 114.

The hidden layers in the convolution neural network can include filters that are tuned or configured to detect information based on the sensed data. As the data processing system 102 steps through each layer in the convolution neural network, the data processing system 102 can translate the input from a first layer and output the transformed input to a second layer, and so on. The convolution neural network can include one or more hidden layers based on the type of object or information being detected and the type of input sensor data.

The data processing system 102 can train the first neural network 114 using historical data 134. In some instances, the first neural network 114 can be trained on one or more servers remote from the data processing system 102 installed on the first vehicle 138. For example, the first neural network 114 can be trained on one or more servers remote from the first vehicle 138, and then loaded or transmitted to the first vehicle 138. In some instances, the first neural network 114 can be trained by the data processing system 102 executing on the first vehicle 138. In some instances, the first neural network 114 can obtain the historical data 134 from a second vehicle 140 via network 101.

The first neural network 114 can be trained to detect objects, scene segmentation, roads, terrain, trees, curbs, obstacles, depth or range of the parking lot, parking line detection, parking marker detection, parking signs, or other objects at or associated with a parking lot or parking zone.

Figure 4:
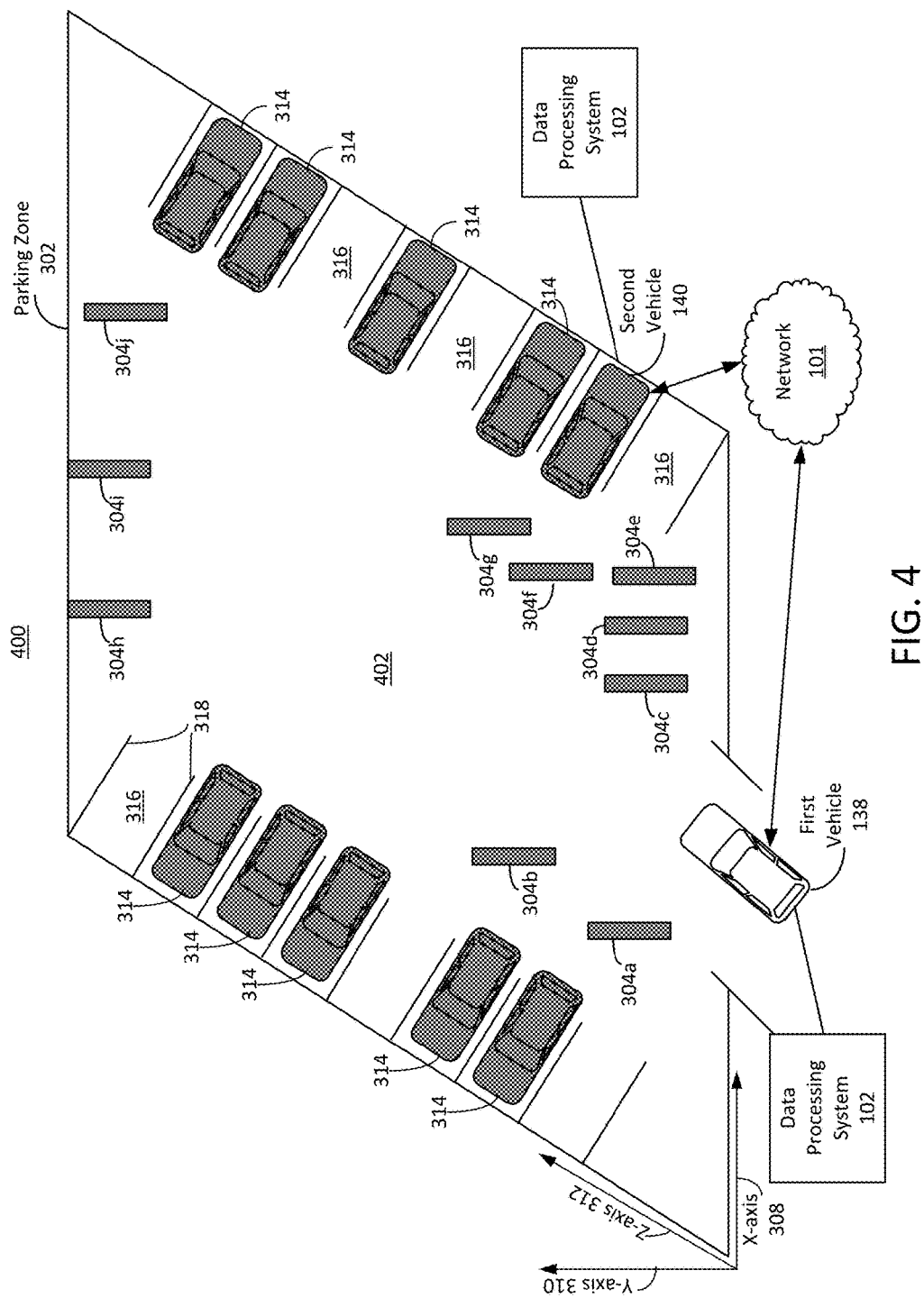
FIG. 4 depicts an example of network-based path generation for a vehicle controller, in accordance with an embodiment.
Figure 5:
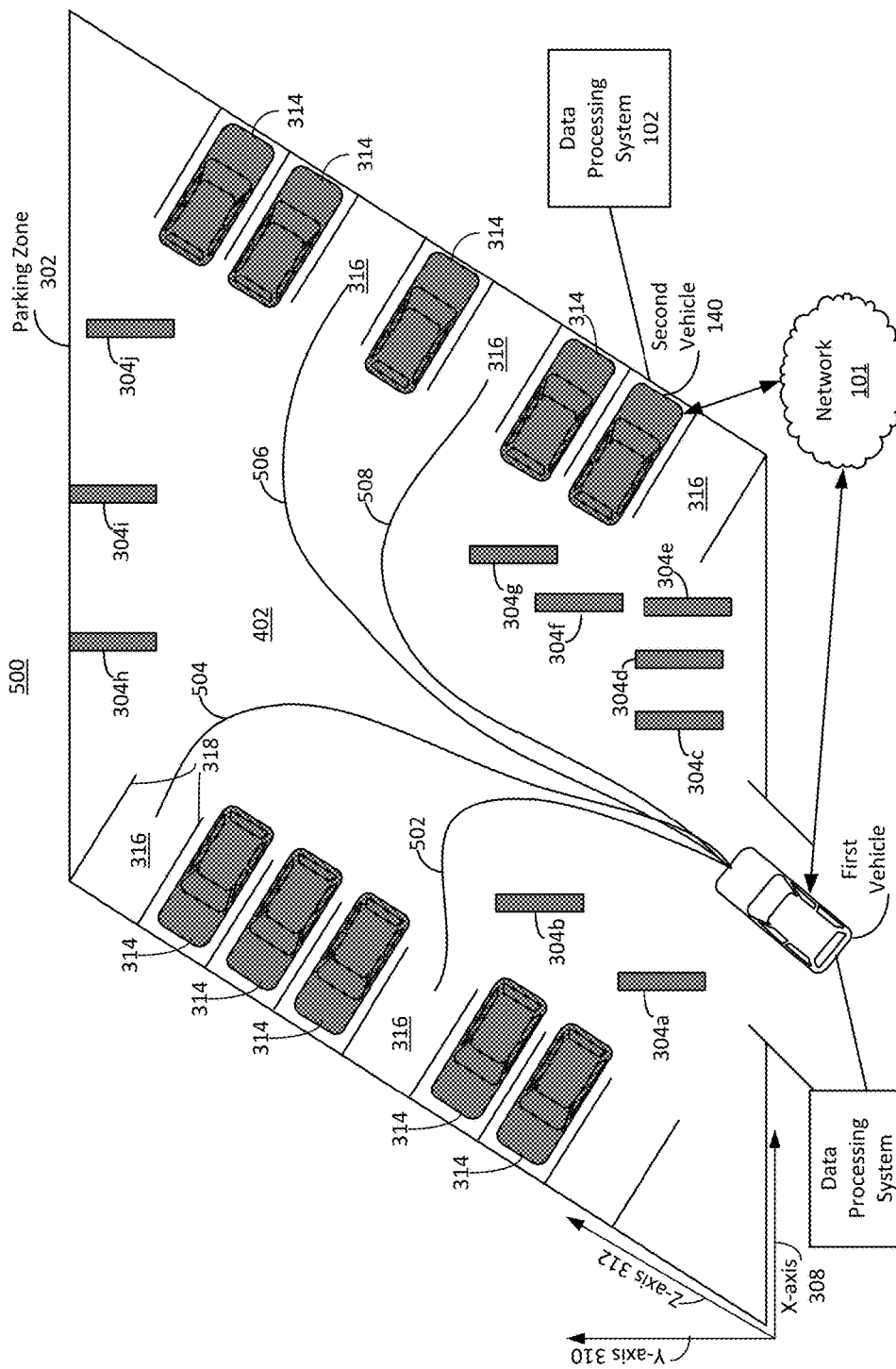
FIG. 5 depicts an example of network-based path generation for a vehicle controller, in accordance with an embodiment.

The data processing system 102 can generate, from a first neural network 114 and based on the data sensed by the one or more sensors, a three-dimensional dynamic map. A three-dimensional dynamic map can refer to a digital map having three dimensions on an x-y-z coordinate plane (e.g., as depicted in FIGS. 3-5). The dimensions can include, for example, width (e.g., x-axis), height (e.g., y-axis), and depth (e.g., z-axis). The dimensions can include, for example, latitude, longitude, and range. The digital map can be a dynamic digital map. For example, the digital map can be updated periodically or reflect or indicate a motion, movement or change in one or more objects detected via the first neural network 114. For example, the digital map can include stationary objects associated with the scene, such as a curb, tree, lines, parking signs, or boundary of the parking zone. The digital map can also include non-stationary objects, such as a person moving (e.g., walking, biking, or running), vehicles moving, or pets moving. The digital map can be configured to detect the amount or type of movement and characterize the movement as a velocity vector having a speed and a direction in the three-dimensional coordinate plane established by the three-dimensional digital map. The data processing system 102 can update the velocity vector periodically. The data processing system 102 can predict a location of the object based on the velocity vector between intermittent updates. For example, if the update period is 2 seconds, the data processing system 102 can determine a velocity vector at $t_0=0$ seconds, and then use the velocity vector to predict the location of the object at t=1 second, and then place the object at the predicted location for an instance of the digital map at $t_1=1$ second. The data processing system 102 can then receive updated sensed data at $t_2=2$ seconds, and then place the object on the three-dimensional digital map at the actual sensed location for $t_2$, as well as update the velocity vectors. The update rate can be 1 Hz, 10 Hz, 20 Hz, 30 Hz, 40 Hz, 50 Hz, 100 Hz, 0.5 Hz, 0.25 Hz, or some other rate that facilitates parking assistance.

The data processing system 102 can include a path generation component 108 designed and constructed to generate, from a second neural network 116, a first path based on the digital map. The path generation component 108 can select a second neural network 116 that is designed, constructed, tuned, configured or operational to generate paths using the digital map (or three-dimensional digital map) generated via the mapping engine component 106 and the first neural network 114. The second neural network 116 can be maintained by the deep learning engine 112. The second neural network 116 can include one or more component or functionality of the first neural network 114. The second neural network 116 can be a same type of neural network as the first neural network 114. The second neural network 116 can differ from the first neural network 114 in that the second neural network 116 can be tuned, or trained on different data sets, configured to receive different inputs, and configured to generate a different output. For example, the second neural network 116 can be trained using data sets that include digital maps as opposed to the raw, sensed data from one or more sensors 142. The second neural network 116 can be configured to generate paths over which a vehicle traverses in a parking zone in order to enter a parking space, as opposed to detecting objects, scene segmentation, parking line detector or depth detection as in the first neural network 114. Thus, the second neural network 116 can be trained using historical digital maps and weighted to produce one or more paths based on the input digital map.

The data processing system 102 (e.g., via the path generation component 108) can select the second neural network 116. The data processing system 102 can select the second neural network 116 from a plurality of neural networks. The data processing system 102 can select the second neural network 116 based on a determination or identification that the second neural network 116 is configured to receive the digital map as input and output one or more paths. The data processing system 102 can determine that there are multiple neural networks that are designed or configured to generate paths based on an input digital map. The data processing system 102 can select the neural network configured to generate paths for a type of parking zone or a characteristic of the digital map. For example, if the digital map includes a parking lot at a supermarket with access to GPS data, the data processing system 102 can select a second neural network 116 that is configured to receive such information. If the digital map includes a parking garage without access to GPS data, then the data processing system can select a different second neural network 116 that is trained, configured or designed to generate paths for parking garages without access to GPS information. If the digital map includes multiple fast moving objects, the data processing system 102 can select a second neural network 116 that is designed, constructed or trained to generate paths to facilitate parking the vehicle in view of the multiple fast moving objects.

Thus, the path generation component 108 can, in some instances, perform pre-processing on the digital map generated by the mapping engine component 106 (e.g., using the first neural network 114) to determine a characteristic of the digital map and then select a type of second neural network 116 that is tuned or trained to generate paths based on the characteristic of the digital map. Characteristics can include a type of parking zone (e.g., parking lot, parking garage, on-street parking), entity type associated with the parking zone (e.g., parking lot at a grocery store, parking lot at a mall, parking lot at sports arena, or parking lot at a restaurant), size of the parking zone (e.g., number of parking spaces, dimensions of the parking zone), dynamics of the parking zone (e.g., number of moving objects; types of moving objects such as people, other vehicles, children, or pets; or rate of movement of the objects).

The data processing system 102, via the path generation component 108, can then generate a second path using a third neural network 118. The third neural network 118 can be configured to receive, as input, the first path generated by the path generation component 108 using the second neural network 118, as well as vehicle dynamics information. Vehicle dynamics information can be collected or detected by sensors 142 of the first vehicle 138, such as a second one or more sensors. Vehicle dynamics information can include, for example, an orientation of the vehicle, speed of the vehicle, velocity vector of the vehicle, direction of movement of the vehicle, size of the vehicle (e.g., length, width, height), weight of the vehicle, or turning radius of the vehicle. The second one or more sensors that provide the vehicle dynamics information can include at least one sensor that overlaps with the first one or more sensors used to generate the digital map data structure. The second one or more sensors that provide the vehicle dynamics information can be mutually exclusive from the first one or more sensors used to generate the digital map data structure. The second one or more sensors can include one or more different types of sensors, or one or more same sensors. The second one or more sensors can include one or more different types of sensors as compared to the first one or more sensors, or one or more same sensors of the first one or more sensors.

The first vehicle can include sensors 142 that are designed, constructed, configured or operational to detect vehicle dynamics information. Sensors 142 can include sensors that detect, for example, an automobile layout, vehicle powertrain information, braking system information, steering information, suspension information, and wheel and tire information. The data processing system 102 or sensors 142 can detect or identify vehicle dynamics information based on aerodynamics information such as drag coefficient, aerodynamics, center of pressure, downforce, ground effect in the vehicle. The data processing system 102 or sensors 142 can detect or identify vehicle dynamics information related to the geometry of the vehicle, such as steering geometry, axle track, camber angle, caster angle, roll center, scrub radius, steering ratio, toe, or wheelbase. The data processing system 102 or sensors 142 can detect or identify vehicle dynamics information related to mass of the vehicle, such as center of mass, moment of inertia, roll moment, sprung mass, unsprung mass, or weight distribution. The data processing system 102 or sensors 142 can detect or identify vehicle dynamics information related to motion of the vehicle, such as body flex, body roll, bump steer, directional stability, critical speed, noise, vibration, harshness, pitch, ride quality, roll, speed wobble, understeer, overstseeer, lift-off oversteer, fishtailing, weight transfer, load transfer, yah. The data processing system 102 or sensors 142 can detect or identify vehicle dynamics information related to tire information, such as camber thrust, circle of forces, contact patch, cornering force, ground pressure, pneumatic trail, radial force variation, relaxation length, rolling assistance, self aligning torque, slip angle, slip, steering ratio, tire load sensitivity. The data processing system 102 or sensors 142 can detect or identify vehicle dynamics information related to the road or surface of the parking zone, such as banked turn, cross slope, drainage gradient, cant, superelevatoin, road slipperiness, split friction, surface roughness, or texture. The data processing system 102 can retrieve vehicle dynamics information stored in a vehicle dynamics data structure 128 in the data repository 122.

The data processing system 102 (e.g., path generation component 108) can receive the vehicle dynamics information from one or more sensors 142 of the first vehicle 138, and input the vehicle dynamics information into the third neural network 118. The data processing system 102 can also provide, as input to the third neural network 118, the first path generated via the second neural network 116, which was generated using the digital map generated via the first neural network 114. The path generation component 108 can generate a second path based on the first path and vehicle dynamics information using the third neural network 118.

In some cases, the data processing system 102 can generate the second path to park the vehicle based on the first path, vehicle dynamics information and at least one historical path stored in vehicle memory (e.g., paths data structure 130). The second path can be a same path as the first path, or different form the first path. For example, the first path can be an initial path, and the second path can be a final path that the data processing system 102 is going to instruct or command the vehicle to traverse. The first path can be referred to as an initial path because it may have been generated without taking into account the vehicle dynamics information. The second path can be referred to as a selected path or final path because it can be generated by taking into account the vehicle dynamics information or current vehicle dynamics information.

The third neural network 118 can be maintained by the deep learning engine 112. The third neural network 118 can include one or more component or functionality of the first neural network 114 or second neural network 116. The third neural network 118 can be a same type of neural network as the first neural network 114 or second neural network 116. The third neural network 118 can include a convolution neural network. The third neural network 118 can be trained using data sets that include paths and vehicle dynamics as opposed to the raw, sensed data from one or more sensors 142 or a digital map, as in the first neural network 114 and second neural network 116, respectively. The third neural network 118 can be configured to generate, using vehicle dynamics information and an initial path, a final path over which a vehicle traverses in a parking zone in order to enter a parking space, as opposed to detecting objects, scene segmentation, parking line detector or depth detection as in the first neural network 114, or selecting an initial path without vehicle dynamics information as in the second neural network 116.

By using a third neural network 118 that is designed, configured, trained and tuned to generate a final path using one or more initial paths and vehicles dynamics as input, the data processing system 102 can generate an improved final path that facilitates efficiently parking a vehicle 138 in a parking zone. For example, the final path can select one of the initial paths based on a current speed of the vehicle, roll of the vehicle, orientation of the vehicle, size of the vehicle, or road surface information. For example, the data processing system 102 can determine, via the third neural network 118, that the vehicle 138 is a minivan and has a high turning radius as compared to a compact car. The data processing system 102 can determine that at least one of the initially generated paths by the second neural network 116 would be challenging or not possible to traverse by the minivan because a portion of the at least one of the initially generated paths requires a low turning radius. Thus, the data processing system 102 can decrease the weight of the paths with low turning radius based on the vehicle dynamics information, and increase the weights of the paths with only higher turning radius (e.g., paths whose lowest turning radius is equal to or greater than the turning radius capable of being performed by the minivan) in order to select a final path that is satisfactory for the type of vehicle 138.

The data processing system 102 can adjust weights of the initial paths to select a final path based on the surface conditions of the parking zone or speed of the vehicle 138. For example, if it is snowing and the vehicle is moving at a velocity greater than threshold, the data processing system 102 can determine that it may not be able to slow the vehicle down abruptly or make a sharp turn, and, therefore, the data processing system 102 can select a second path using the vehicle dynamics information and the first path as input to the third neural network 118 that does not require the vehicle to make sharp turns or abruptly stop, thereby preventing skidding on the slippery surface of the parking zone.

The data processing system 102 can include a controller component 110 designed, constructed, and operational to provide commands to control the vehicle to follow the second path to park the vehicle in the parking zone. The data processing system 102 or controller component 110 can be configured to interface with first vehicle 138 to control speed, acceleration, braking, and steering. For example, the controller component 110 can include or interface with an electronic control unit ("ECU") of the vehicle 138 to provide drive-by-wire functionality. The controller component 110 or ECU can be referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS). For example, the data processing system 102 of a first vehicle 138 can instruct a BCM to move the first vehicle 138 along a selected second path in a parking zone, can instruct a TCU to identify a location of the first vehicle 138, e.g., relative to the selected second path with coordinates on the digital map stored in digital map data structure 126, and can instruct a TCM or ECM to move the first vehicle 138 from a first position on the selected second path to a second position on the selected second path, or ultimately to an endpoint of the selected second path. For example, the path can include one or more points, such as a beginning point and endpoint. The path can be defined using an function. The path can be defined as a multiple points. The path can be defined as an arc, a series of vectors, or series of lines. The path can include characteristics such as velocity or acceleration. Thus, the data processing system 102 can utilize the ECU, or components thereof, to control the vehicle 138 to move in accordance with the selected second path generated via the third neural network 118.

In some cases, the data processing system 102 can utilize a fourth neural network 120 to generate the commands to control the vehicle to traverse the selected path to park the vehicle 138. The data processing system 102 can input the select path into a fourth neural network 120 along with information about the types of control commands available for the vehicle 138 in order to generate the controls. The fourth neural network 120 can be trained, tuned, or configured to generate output controls based on an input path. The fourth neural network 120 can be trained to generate the appropriate controls for the type of vehicle 138. The fourth neural network 120 can generate improved controls relative to a hand-made algorithm because the fourth neural network can generate controls that may efficiently and smoothly control the car to traverse the selected second path. For example, the fourth neural network 120 can be trained to weight controls that reduce sudden acceleration, de-acceleration, or changes in direction or orientation. The fourth neural network can be trained to generate steering commands that are in synchronization with acceleration controls or braking controls. The fourth neural network can be trained to reduce resource consumption, battery consumption, gas consumption, or brake pad consumption.

The fourth neural network 120 can be maintained by the deep learning engine 112. The fourth neural network 120 can include one or more component or functionality of the first neural network 114. The fourth neural network 120 can be a same type of neural network as the first neural network 114, such as a convolution neural network. However, the fourth neural network 120 can be trained using data sets that include paths and vehicle control information, as opposed to the raw, sensed data from one or more sensors 142, or digital maps. The fourth neural network 120 can be configured to generate commands or instructions to control the vehicle 138 to traverse the selected path in the parking zone in order to enter a parking space, as opposed to detecting objects, scene segmentation, parking line detector or depth detection as in the first neural network 114.

Figure 2:
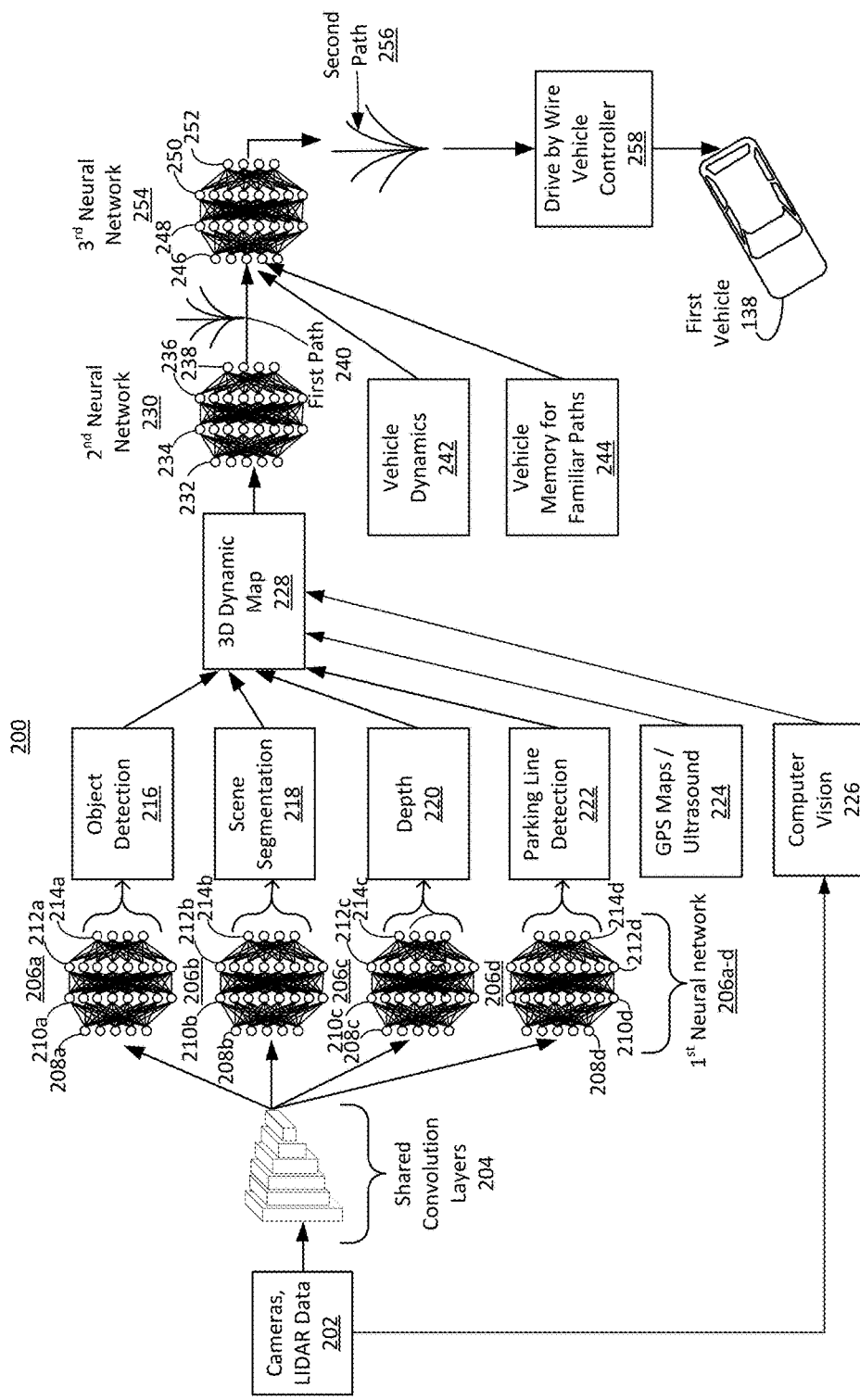
FIG. 2 depicts an example operational diagram for network-based path generation for a vehicle controller, in accordance with an embodiment.

FIG. 2 depicts an example operational diagram for neural network-based vehicular parking control. The operation 200 can be performed by one or more system, component or function depicted in FIG. 1 and FIG. 7. For example, the operation can be performed by a data processing system, mapping engine, path generation component, controller component, deep learning engine, vehicle or sensors. At ACT 202, the data processing system can receive, identify or collect data sensed by one or more cameras, radar, lidar, or other sensor. The data processing system can receive, identify or collect the sensed data periodically, such as 0.1 Hz, 0.5 Hz, 1 Hz, 5 Hz, 10 Hz, 20 Hz, 30 Hz, 50 Hz or more. The data processing system can collect the data in a raw format or preprocessed format. In some cases, the data processing system can collect the data responsive to a request to collect data. For example, the data processing system can receive an indication or request to perform parking assistance. Responsive to the request to perform parking assistance, the data processing system can poll or ping the one or more sensors to cause the sensors to collect the data. The sensors can be in a standby state, offline state, power saving state, or active state. In some cases, the sensors can be turned on or changed from a standby state to an active state responsive to an instruction from the data processing system, which can be responsive to an indication to perform parking assistance. By activating the sensors responsive to the indication to perform a parking assistance function, the data processing system can reduce resource consumption of the sensors, data collection, memory use to store the data, as well as increase the longevity of such sensors as a result of less wear and tear on the sensor.

At ACT 204, the data processing system can pass the data collected at ACT 202 to shared convolution layers of a neural network. The neural network can be a first neural network 206a-d that includes multiple sub-neural networks 206a, 206b, 206c, and 206d. The sub-neural networks can be separate neural networks or combined or shared neural networks that can share one or more aspect, characteristic, logic, or weight. The first neural network 206a-d can include one or more component or functionality as the first neural network 114 depicted in FIG. 1. The first neural network 206a-d can be trained, configured or operational to receive, as input, the collected data at ACT 202, and output data. Each neural network can include an input layer, one or more hidden layers, and an output layer. For example, the sub-neural network 206a can be configured to receive the sensed data at input layer 208a. The sub-neural network 206a can include one or more hidden layers 210a and 212a. The hidden layers can be convolution layers, pooling layers, fully connected layers, or weighted layers. Each node in the layer can perform a process or operation on the data. Each node or layer can transform an input data to generate an output data (e.g., an intermediate output that can be passed to a subsequent layer, or a final output passed to another component in the system).

For example, the first input layer 208a of sub-neural network 206a can receive the sensed data, process the sensed data to transform the data to a first intermediate output, and forward the first intermediate output to a first hidden layer 210a. The first hidden layer 210a can receive the first intermediate output, process the first intermediate output to transform the first intermediate output to a second intermediate output, and forward the second intermediate output to a second hidden layer 212a. The second hidden layer 212a can receive the second intermediate output, process the second intermediate output to transform the second intermediate output to a third intermediate output, and forward the third intermediate output to an output layer 214a. The output layer 214a can receive the third intermediate output, process the third intermediate output to transform the third intermediate output to a final output, and forward the final output. The final output can include object detection data 216. Thus, the sub-neural network 206a can be configured, trained, tuned or operational to receive sensed data and output object detection information 216 using a convolution neural network having one or more hidden layers.

The first input layer 208b of sub-neural network 206b can receive the sensed data, process the sensed data to transform the data to a first intermediate output, and forward the first intermediate output to a first hidden layer 210b. The first hidden layer 210b can receive the first intermediate output, process the first intermediate output to transform the first intermediate output to a second intermediate output, and forward the second intermediate output to a second hidden layer 212b. The second hidden layer 212b can receive the second intermediate output, process the second intermediate output to transform the second intermediate output to a third intermediate output, and forward the third intermediate output to an output layer 214b. The output layer 214b can receive the third intermediate output, process the third intermediate output to transform the third intermediate output to a final output, and forward the final output. The final output can include scene segmentation data 218 (e.g., roads, terrain, trees, curbs, or obstacles). Thus, the sub-neural network 206b can be different from the sub-neural network 206a because the sub-neural network 206b can be configured, trained, tuned or operational to receive sensed data and output scene segmentation information 218 using a convolution neural network having one or more hidden layers.

The first input layer 208c of sub-neural network 206c can receive the sensed data, process the sensed data to transform the data to a first intermediate output, and forward the first intermediate output to a first hidden layer 210c. The first hidden layer 210c can receive the first intermediate output, process the first intermediate output to transform the first intermediate output to a second intermediate output, and forward the second intermediate output to a second hidden layer 212c. The second hidden layer 212c can receive the second intermediate output, process the second intermediate output to transform the second intermediate output to a third intermediate output, and forward the third intermediate output to an output layer 214c. The output layer 214c can receive the third intermediate output, process the third intermediate output to transform the third intermediate output to a final output, and forward the final output. The final output can include depth information 220 (e.g., depth or range of the parking zone or one or objects therein). Thus, the sub-neural network 206c can be different from the sub-neural networks 206a-b because the sub-neural network 206c can be configured, trained, tuned or operational to receive sensed data and output depth information 220 using a convolution neural network having one or more hidden layers.

The first input layer 208d of sub-neural network 206d can receive the sensed data, process the sensed data to transform the data to a first intermediate output, and forward the first intermediate output to a first hidden layer 210d. The first hidden layer 210d can receive the first intermediate output, process the first intermediate output to transform the first intermediate output to a second intermediate output, and forward the second intermediate output to a second hidden layer 212d. The second hidden layer 212d can receive the second intermediate output, process the second intermediate output to transform the second intermediate output to a third intermediate output, and forward the third intermediate output to an output layer 214d. The output layer 214d can receive the third intermediate output, process the third intermediate output to transform the third intermediate output to a final output, and forward the final output. The final output can include parking line detection 222 (e.g., lines, paint, markers, signs, or other indicia of a parking space or parking spot within a parking zone). Thus, the sub-neural network 206c can be different from the sub-neural networks 206a-c because the sub-neural network 206d can be configured, trained, tuned or operational to receive sensed data and output parking line detection 222 information using a convolution neural network having one or more hidden layers.

The data processing system can, in some cases, utilize a first neural network having a plurality of sub-neural networks. To do so, the data processing system can tune, based on historical data, the plurality of sub-neural networks of the first neural network to generate digital maps based on the types of input to be processed and output to be generated. For example, the data processing system can generate, from a first sub-neural network of the plurality of sub-neural networks, object detection information. The data processing system can generate, from a second sub-neural network of the plurality of sub-neural networks, scene segmentation information. The data processing system can generate, from a third sub-neural network of the plurality of sub-neural networks, depth information. The data processing system can generate, from a fourth sub-neural network of the plurality of sub-neural networks, parking line information. The data processing system can then construct the digital map based on the object detection information, the scene segmentation information, the depth information, and the parking line information.

In some cases, one or more of the sub-neural networks 206a-d can be combined or share functions or processing. For example, an output of a first sub-neural network 206a can be input to a second sub-neural network 206b; an output of a second sub-neural network 206b can be input to a third sub-neural network 206c; an output of a second sub-neural network 206b can be input to a third sub-neural network 206c; and an output of a third sub-neural network 206c can be input to a fourth sub-neural network 206d, for example. In some cases, outputs of two sub-neural networks can be input to a single sub-neural network. For example, outputs of a first sub-neural network 206a and a second sub-neural network 206b can be input to the third sub-neural network 206c.

In some cases, the data processing system can perform parallel processing for the multiple sub-neural networks of the first neural network 206a-d to reduce latency or delay, thereby improving the responsiveness and frequency of updates.

At ACT 228, the data processing system can generate digital map data structure, such as a three-dimensional ("3D") dynamic map. The data processing system can generate the digital map data structure by combining GPS map information and deep learning-intermediate perception to generate the dynamic map. The data processing system can generate the dynamic map using a fusion of depth, object/obstacle detection and road information. The data processing system can generate the 3D dynamic map using the object detection information 216, scene segmentation information 218, depth information 220, and parking line detection 222 generated from the first neural network 206a-d. The data processing system can also use, as input, information from GPS sensors or ultrasonic transducers 224, or computer vision or imaging information 226. The computer vision or imaging information 226 can be different from the data generated via the first neural network 206a-d because the computer vision 226 data may not utilize a neural network. The computer vision 226 may include images that are not processed using artificial intelligence neural networks, or convolution neural networks, or multiple sub-neural networks.

The data processing system can establish the parking zone using location information from a satellite based global positioning system, and use the established parking zone to generate the 3D dynamic map. The data processing system can obtain location information from GPS or other location techniques. The data processing system may retrieve a map for a parking zone by performing a lookup in a parking zone data structure 132 stored in a data repository of the data processing system. The data processing system can use the retrieved parking zone map to establish the parking zone for the 3D dynamic map.

The data processing system can generate the 3D dynamic map with or without the GPS information. In some cases, the data processing system may not have access to GPS information. For example, the parking zone may be enclosed in a parking garage that may not have access to a GPS satellite. Thus, the data processing system can generate the 3D dynamic map, a first path, and a second path in the absence of information from a satellite based global position system.

At ACT 240, the data processing system can generate a first path or initial path. The first path can refer to or include one or more paths, such as a plurality of candidate paths. The data processing system can generate the first path or initial path using a second neural network 230. The second neural network 230 can include one or more component or function of second neural network 116 depicted in FIG. 1.

The input layer 232 of the second neural network 230 can receive the 3D dynamic map 228 generated and output from the shared convolution layers of the first neural network 206a-d. The input layer 232 can process the 3D dynamic map to transform the data to a first intermediate output, and forward the first intermediate output to a first hidden layer 234. The first hidden layer 234 can receive the first intermediate output, process the first intermediate output to transform the first intermediate output to a second intermediate output, and forward the second intermediate output to a second hidden layer 236. The second hidden layer 236 can receive the second intermediate output, process the second intermediate output to transform the second intermediate output to a third intermediate output, and forward the third intermediate output to an output layer 238. The output layer 238 can receive the third intermediate output, process the third intermediate output to transform the third intermediate output to a final output, and forward the final output. The final output can include an initial or first path. Thus, the second neural network 230 can be different from the first neural networks 206a-d because the second neural network 230 can be configured, trained, tuned or operational to receive a digital map or 3D dynamic map and output one or more candidate paths for parking using a convolution neural network having one or more hidden layers.

At ACT 256, the data processing system can generate a second path or a final path. To do so, the data processing system can receive vehicle dynamics information 242 as well as obtain information about familiar paths from the memory of the first vehicle 138 (or another vehicle in communication with the first vehicle 138). The data processing system can incorporate the vehicle dynamics to generate the second path (or final path) for the vehicle to follow. The data processing system can obtain the vehicle dynamics information from a second one or more sensors. The data processing system can use a third neural network 254 to generate the second path or final path. The input layer 246 of the third neural network 254 can receive the one or more candidate first paths 240, the vehicle dynamics information 242 and information about familiar paths 244. The input layer 246 can process the one or more candidate first paths 240, the vehicle dynamics information 242 and information about familiar paths 244 to transform the data to a first intermediate output, and forward the first intermediate output to a first hidden layer 248. The first hidden layer 248 can receive the first intermediate output, process the first intermediate output to transform the first intermediate output to a second intermediate output, and forward the second intermediate output to a second hidden layer 250. The second hidden layer 250 can receive the second intermediate output, process the second intermediate output to transform the second intermediate output to a third intermediate output, and forward the third intermediate output to an output layer 252. The output layer 252 can receive the third intermediate output, process the third intermediate output to transform the third intermediate output to a final output, and forward the final output. The final output can include a second or final path. Thus, the third neural network 254 can be different from the first neural networks 206*a*-*d* or second neural network 230 because the third neural network 254 can be configured, trained, tuned or operational to receive the one or more candidate first paths 240, the vehicle dynamics information 242 and information about familiar paths 244 and output, using a convolution neural network having one or more hidden layers, a second or final path to be used for controlling the vehicle 138.

In some cases, the data processing system can use both computer vision and one or more neural networks to detect the parking line information with increased accuracy and to decide if the parking spot is available or not. For example, the data processing system can perform parking line detection 222 using computer vision 226 as well as one or more neural networks, such as neural network 206*d*. The data processing system can further determine, based on the object detection 216 information, whether the parking spot detected at parking line detection 222 are available or occupied.

At ACT 258, the data processing system can generate and provide commands to control the first vehicle 138 to follow the selected or generated second path at ACT 256. The data processing system can use a drive by wire vehicle controller to provide the commands or control the vehicle. The data processing system can display the path being followed on a display device of the first vehicle 138. The data processing system can provide commands at a frequency or rate to allow the vehicle 138 to smoothly traverse or follow the path.

FIG. 3 depicts an example of neural network-based vehicular parking control at a parking zone. The digital map 300 can be generated by one or more system, component or function depicted in FIG. 1, 2, or 7, including, for example, by a data processing system, mapping engine, path generation component, controller component, deep learning engine, vehicle or sensors. The digital map 300 depicts a parking zone 302. The parking zone 302 can include a parking lot, parking area, and one or more parking spaces. The parking zone 302 can be adjacent to or for an entity, such as a grocery store, business, restaurant, retail store, sports arena, or music arena. The parking zone 302 can include one or more objects 304*a*-*j*. The objects 304*a*-*j* can include, for example, obstacles, people, pets, trees, signs, trash cans, debris, barriers, or other items or objects.

A first vehicle 138 can enter the parking zone 302. The first vehicle 138 can be configured with a data processing system 102. The data processing system 102 can collect sensor data 306 via one or more sensors 142 of the first vehicle 138. The data processing system 102 can use the collected sensor data to generate a digital map of the parking zone 302. The parking zone can include one or more vehicles 314 parked in spaces in the parking zone 302. The parking zone 302 can also include one or more empty parking spaces 316. The data processing system can detect the vacant, empty or available parking space 316 based on an absence of an object detection in the parking space 316, combined with a detection of the parking space (e.g., based on parking lines 316, historical data, deep learning, or parking line detection 222). The parking zone 302 can include a second vehicle 140 configured with a data processing system 102. The data processing system 102 of the first vehicle 102 can collect the sensor data 306 to generate a digital map of the parking zone 302. The data processing system 102 can generate a 3D dynamic map that has a coordinate system with an x-axis 308, y-axis 310, and a z-axis 312. The axes 308, 310, or 312 can be rotated, swapped or interchanged. The axes can represent a length, width, and depth of the parking zone. The first neural network (e.g., first neural network 114) can receive the collected sensor data to generate the digital map 300 (e.g., at ACT 228 depicted in FIG. 2).

For example, and in some cases, a camera may not be able to detect parking lines 318. The parking lines or markers may either be non-existent or not visible to the sensors used to collect data. The data processing system can use the first neural network to determine, identify, predict or estimate where the parking lines 318 are in the parking zone, determine parking boundaries or parking spaces. The data processing system 102 can be trained to identify, detect, or predict the parking spaces with or without the parking lines.

FIG. 4 depicts an example of neural network-based vehicular parking control at a parking zone. FIG. 4 depicts a weighted map 400 that can be generated by one or more system, component or function depicted in FIG. 1, 2, 3 or 7, including, for example, by a data processing system, mapping engine, path generation component, controller component, deep learning engine, vehicle or sensors. The weighted map 400 depicts a parking zone 302. Weighted map 400 depicts a 3D dynamic map generated by the data processing system 102 of the first vehicle 138. The 3D dynamic map may or may not be rendered for display by the first vehicle 138. The 3D dynamic map can refer to a data structure or stored data that can be processed by the first vehicle to generate and traverse a parking path.

The data processing system 102 can generate a weighted map 400 that weights objects or obstacles, as well as free space. For example, the data processing system 102 can assign a high weight to portions of the parking zone 302 that are conducive to place a path for parking, and assign a low weight to portions of the parking zone 302 that are not conducive for a path. For example, the objects 304*a*-*j* can be assigned a low weight because they are obstacles or objects that may block the vehicle 138. The objects 304*a*-*j* (grayed out in FIG. 4), can be assigned the low weight such that the data processing system 102 may avoid generating a path that traverses one of the objects 304a-j. Similarly, the data processing system 102 can assign a low weight to other vehicles 314 and the vehicle 140. The data processing system 102, however, can assign a high weight to the portions 402 of the parking zone 302 that are not occupied by objects 304a-j or vehicles 314. The portion 402 can refer to portions or areas of the parking zone 302 that in which an object or obstacle (e.g., 304 or 314) is absent or not detected by the data processing system. The weights can be assigned by one or more neural networks. A second neural network (e.g., second neural network 116) can generate or assign the weights to create the weighted map (e.g., at ACT 240 depicted in FIG. 2). The second neural network can be trained to assign weights based on historical training data. The second neural network can assign the weights to generate a parking path that facilitates directing the vehicle to an available parking space.

FIG. 5 depicts an example of neural network-based vehicular parking control at a parking zone. FIG. 5 depicts a weighted map 500 that can be generated by one or more system, component or function depicted in FIG. 1, 2, 3, 4 or 7, including, for example, by a data processing system, mapping engine, path generation component, controller component, deep learning engine, vehicle or sensors. The data processing system 102 can use the assigned weights to generate the paths. For example, the data processing system 102 can use the second neural network 116 (and assigned weights from weighted map 400) to generate one or more candidate paths 502, 504, 506 and 508. Each of the candidate paths 502, 504, 506 and 508 can be potential paths that direct the vehicle 138 to an available parking space 316. The data processing system 102 can generate the multiple candidate paths from the second neural network 116 (e.g., at ACT 240 depicted in FIG. 2).

The data processing system 102 can then select one of the candidate paths using a third neural network (e.g., third neural network 118, or ACT 256 depicted in FIG. 2) along which to direct the vehicle 138. The data processing system 102 can input additional information such as vehicle dynamics or vehicle memory for familiar paths to generate the multiple candidate paths from the third neural network 118. For example, the data processing system 102 can determine that path 502 has a tight turning radius that is below the minimum turning radius requirement for the vehicle 138 as determined from vehicle dynamics information. The data processing system 102 can further determine that due to the wet surface of the parking zone 302, that traversing path 508 may require an abrupt braking, which may result in slippage. The data processing system can then determine that parking paths 504 and 506 are the remaining best candidates. Using familiar path information, vehicle dynamics information, or weighting in the third neural network, the data processing system 102 can determine that path 506 is the highest ranking path. For example, the data processing system 102 can determine that path 506 may result in the slowest deceleration (e.g., minimal braking), and is proximate to fewer moving objects (e.g., further from objects 304h, 304i or 304j as compared to path 504). Based on familiar paths traversed by the vehicle, the data processing system 102 can determine that the first vehicle 138 (or user thereof) prefers parking closer to the entrance of the parking zone 302 as compared to further from the entrance of the parking zone 302. Accordingly, the data processing system 102 can select path 506 to park in the available parking space 316 that is closer to the available parking space corresponding to path 504.

In some cases, the data processing system 102 can detect a second vehicle 140 located in the parking zone 302. The second vehicle 140 can refer to a vehicle configured with a data processing system 102 having at least some functionality as the data processing system 102 of the first vehicle 138. The data processing system 102 establish a secure communication channel with the second vehicle 140. The data processing system 102 can request, from the second vehicle 140 via the secure communication channel, map information for the parking zone 302. The data processing system 102 can receive, from the second vehicle 140 responsive to the request, map information for the parking zone 302 stored in memory of the second vehicle 140.

Prior to generation one or more paths 502, 504, 506 or 508 (or selection of a final path), the data processing system 102 can request, the map information for the parking zone from the second vehicle 140. The data processing system can receive, responsive to the request, the map information from the second vehicle 140 and input the map information into a first neural network to generate a digital map, a second neural network to generate a first path, or a third neural network to generate a second path.

For example, the vehicle 138 can include sensors 142 that can include one or more than one transceiver, as well as separate or independent transmitter and receiver components. The transceiver can include receive and transmit chains for wireless communication, that include one or more filters, amplifiers, frequency up/downconverters, mixers, clock sources, analog/digital converters, antennas, among others. The transceiver can send or broadcast messages or communications from its host vehicle (e.g., first vehicle 138), to other vehicles (e.g., second vehicle 140) via the network 101 for instance. The data processing system 102 can use or instruct the transceiver to send or broadcast a message comprising a time instance for an event (e.g., time instance at which the host vehicle entered a parking zone 302). The transceiver can establish a secure communication channel with the second vehicle 140 and send a message to the second vehicle 140 wirelessly using one or more communications protocols, such a communication protocol based on vehicle-to-vehicle (V2V) communications, wireless local area network (WLAN) or wireless fidelity (WiFi, e.g., any variant of IEEE 802.11 including 802.11a/b/g/n), wireless personal area network (WPAN, e.g., Bluetooth, Zigbee, ultra-wideband (UWB), WiMedia, Wibree, wireless universal serial bus, ONE-NET), cellular (e.g., CDMA/CDMA2000, GSM/UMTS, UMTS over W-CDMA, UMTS-TDD, LTE, 3G/4G/5G, and so on), wireless metropolitan area network WIMAN (e.g., WiMax), and other wide area network, WAN technologies (e.g., iBurst, Flash-OFDM, EV-DO, HSPA, RTT, EDGE, GPRS), LoRa, infrared (IR), radio frequency identification (RFID), satellite or geographical positioning system, optical (e.g., lightwave transmission, laser), ultrasonic, dedicated short range communications (DSRC), near field communication (NFC), radar, and so on, though not limited to these. The transceiver can send a message or query to another vehicle 140 using a direct peer-to-peer (P2P) connection, or through a communication network. The transceiver can send the message as a broadcast to a plurality of vehicles in the vicinity, or as a message addressed to identified vehicle(s).

The secure communication channel and communication protocol(s) selected for communicating messages between vehicles can depend on environmental conditions. For example, to ensure a robust or stable communication channel between vehicles under certain severe weather or low-visibility conditions, a cellular-based communication protocol can be used for example, instead of some other communication protocols. Alternatively, two or more modes of wireless communications (e.g., cellular and NFC) can be employed (e.g., in parallel or sequentially) for redundancy to ensure that a message can be conveyed successfully to other vehicles.

The transceiver used for establishing the secure communication channel can receive a message from another vehicle wirelessly using one or more communications protocols, in any manner described herein. The data processing system 102 can receive or detect, using the transceiver, a message or response responsive to the request or query transmitted by the first vehicle 138. The message or responsive can include map information for the parking zone 302. For example, the second vehicle 140 may have entered the parking zone 302 prior to the first vehicle 138 and previously generated a digital map and one or more paths for the parking zone 302. The second vehicle 140 can retrieve, from memory of the second vehicle 140, the digital maps and paths for the parking zone 302, and transmit the digital map and paths to the first vehicle 138. The first vehicle 138 can use the received digital maps and paths from the second vehicle 140 to generate a digital map or one or more paths. In some cases, the first vehicle 138 can leverage the digital map and paths to reduce processing by the first vehicle 138, or generate an improved digital map (e.g., greater resolution or accuracy) or path (e.g., more efficient, smoother, optimal) for the first vehicle 140. Thus, by using a vehicle-to-vehicle communication to obtain historic data, the data processing system 102 of the first vehicle 138 can provide improved parking assistance.

Figure 6:
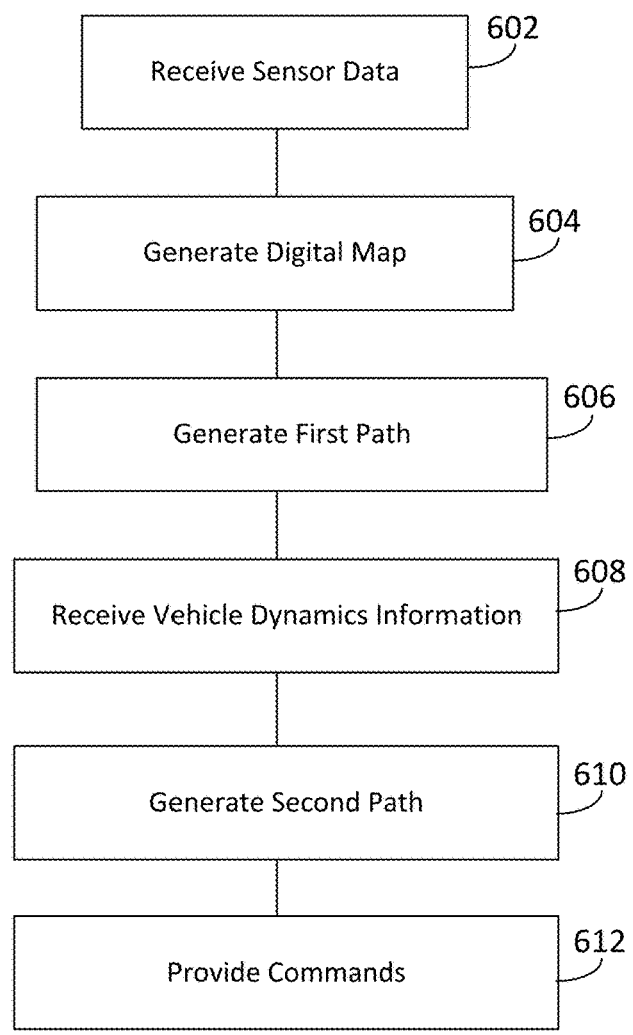
FIG. 6 depicts a flow diagram depicting an example method of network-based path generation for a vehicle controller, in accordance with an embodiment.

FIG. 6 depicts a flow diagram depicting an example method of neural network-based vehicular parking control. The method 600 can be performed by one or more system, component or function depicted in FIG. 1, 2, 3, 4, 5 or 7, including, for example, by a data processing system, mapping engine, path generation component, controller component, deep learning engine, vehicle or sensors. At ACT 602, a data processing system can receive sensor data. The data processing system can receive data sensed by one or more sensors mounted on a vehicle located at a parking zone. The data processing system can receive sensor data periodically, continuously, responsive to a request, responsive to an event or trigger. The data processing system can receive sensor data from one or more sensors. The data processing system can detect a change in a characteristic or measurement associated with a sensor, and then request updated information from the specific sensor that detected the change. The data processing system can request data from all sensors. The data processing system can request data from a subset of sensors based on the type of operation being performed by the data processing system, thereby reducing sensor computing resource utilization, processor utilization, memory utilization, or I/O utilization. For example, the data processing system may have access to a temperature sensor, radar, lidar, a 360 camera and a rear parking camera. The data processing system can decide, for a parking assistance operation, that data is only needed from a subset of sensors, such as the radar, lidar, and 360 camera. Accordingly, the data processing system can select the subset of sensors comprising the lidar, radar and 360 camera. The data processing system may not request data from the rear parking camera and the temperature sensor, thereby reducing resource consumption.

At ACT 604, the data processing system can generate a digital map (or digital map data structure). The data processing system can generate, from a first neural network, a digital map data structure based on the data sensed by the one or more sensors. The data processing system can generate the digital map using a first one or more neural networks. The first one or more neural networks can be configured or trained to receive sensor input and output a digital map. The first one or more neural networks can include sub-neural networks that are tailored, tuned or configured to perform certain functions, such as object detection, scene segmentation, or parking line detection.

In some cases, the data processing system can determine that the data from the one or more sensors is insufficient to generate the digital map for input into the second neural network to generate the first path. For example, the collected data may not have sufficient resolution, granularity, or sampling rate (e.g., the sampling rate may be below a threshold). The collected data may have a low signal-to-noise ratio (e.g., less than a threshold). The collected data may have a high amount of artifacts or noise (e.g., greater than a threshold). The collected data may have erroneous readings (e.g., range measurements that are greater than a threshold set for the parking zone). A sensor may indicate a malfunction or fault during the collected data. The data processing system may generate the digital map from the collected data, and determine the digital map is of poor quality of insufficient quality to generate paths. The data processing system can then generate commands to control the vehicle to traverse a preliminary path within the parking zone to collect additional data about the parking zone from the one or more sensors. The data processing system can generate control to request a human user to navigate the car. The data processing system can connect with a second vehicle to obtain previously generated map or path information. The data processing system can input the additional data to the first neural network to generate the first path. Thus, if the data processing system determines that there is insufficient information to generate a path or satisfactory path, the data processing system can control the vehicle to traverse or circle or navigate the parking zone to collect the information. For example, the data processing system range may have result in collected data only for parking spaces that are occupied, but not further parking spaces in the parking zone. The data processing system can then navigate the car to a far end of the parking zone to obtain information about available parking spaces that may not be present at or proximate to the entrance of the parking zone.

At ACT 606, the data processing system can generate a first path. The data processing system can generate, from a second neural network, a first path based on the digital map (e.g., a 3D dynamic map). The data processing system can input the digital map into the second neural network to generate one or more candidate paths (e.g., a first path). At Act 608, the data processing system can receive vehicle dynamics information from one or more sensors located on the vehicle. The data processing system can receive vehicle dynamics information from a data file stored in memory of the vehicle. Some aspects of the vehicle dynamics information can be static or remain the same (e.g., the dimensions of the vehicle), while some aspects of the vehicle dynamics information can vary (e.g., orientation, roll, pitch, yay, velocity, or weight). Thus, the data processing system can receive vehicle dynamics information from a data file in memory as well as one or more sensors that detect updated vehicle dynamics information.

At ACT 610, the data processing system can generate a second path. The data processing system can generate, with a third neural network, a second path to park the vehicle based on the first path, vehicle dynamics information and at least one historical path stored in vehicle memory. The data processing system can input the first path, vehicle dynamics information and at least one historical path into third neural network. In some cases, the data processing system may not input the at least one historical path into the third neural network. The historical path can refer to a previous path used by the data processing system for the same or similar parking zone. At ACT 612, the data processing system can provide commands to control the vehicle to follow the second path to park the vehicle in the parking lot.

Figure 7:
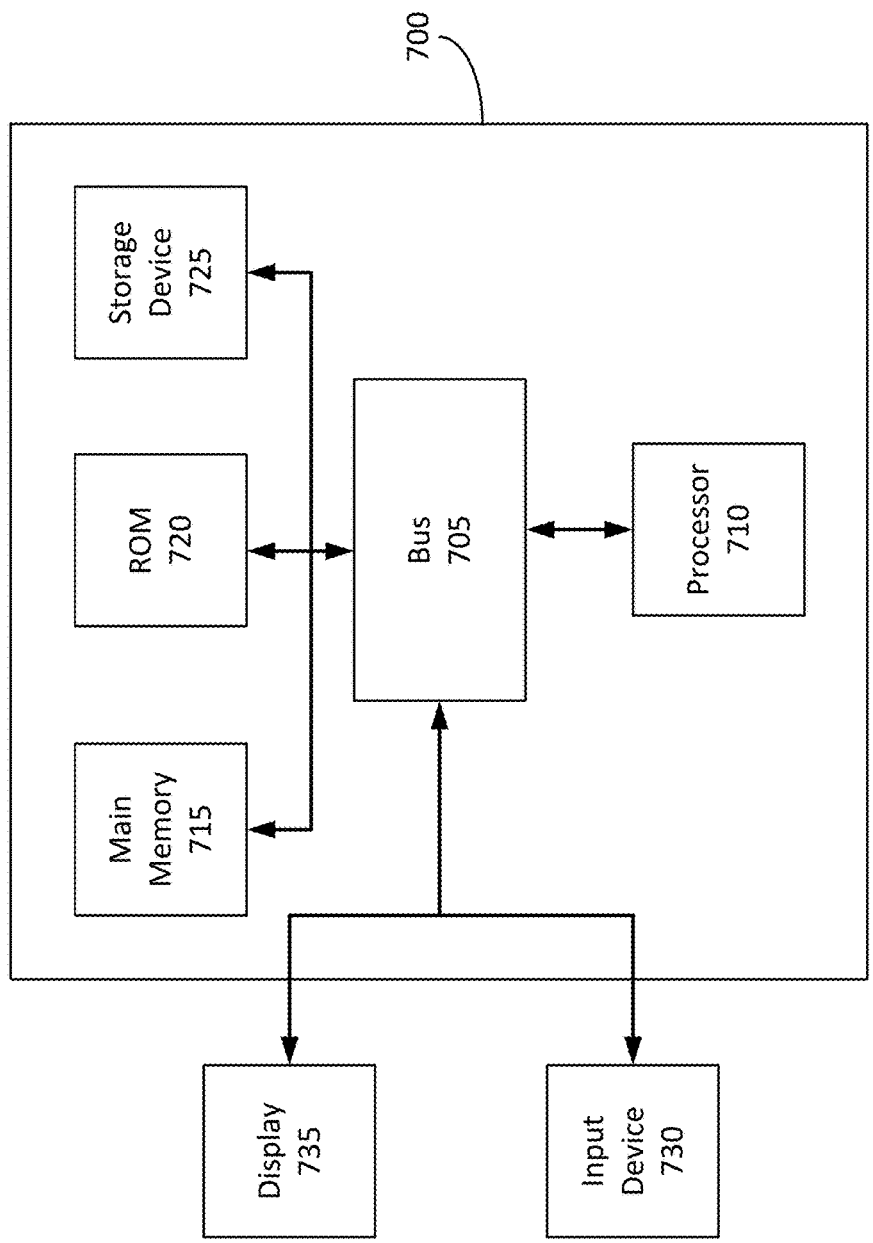
FIG. 7 is a block diagram illustrating an architecture for a computer system that can be employed to implement elements of the systems and methods described and illustrated herein, including, for example, the systems depicted in FIGS. 1-2, operations or examples depicted in FIGS. 3-5, and the method depicted in FIG. 6.

FIG. 7 is a block diagram of an example computer system 700. The computer system or computing device 700 can include or be used to implement the data processing system 102, or its components such as the data processing system 102. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be or include the memory 112. The main memory 715 can also be used for storing position information, vehicle information, command instructions, vehicle status information, environmental information within or external to the vehicle, road status or road condition information, or other information during execution of instructions by the processor 710. The computing system 700 may further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions. The storage device 725 can include or be part of the memory 112.

The computing system 700 may be coupled via the bus 705 to a display 735, such as a liquid crystal display, or active matrix display, for displaying information to a user such as a driver of the first vehicle 138 or the second vehicle 102. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 (e.g., on a vehicle dashboard) can be part of the data processing system 102, the sensor 142, or other component of FIG. 1, as well as part of the vehicle external to the data processing system 102, for example.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the positioning component 105 and map data illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system of network-based path generation for a vehicle controller, comprising:
    a data processing system comprising one or more processors and memory, a mapping engine component, a path generation component, and a controller component, the data processing system to:
    receive data sensed by a first one or more sensors mounted on a vehicle located at a parking zone;
    generate, from a first neural network tuned to process sensor input, a digital map data structure based on the data sensed by the first one or more sensors;
    generate, from a second neural network tuned to process digital map data structures, a first path based on the digital map data structure;
    receive vehicle dynamics information from a second one or more sensors located on the vehicle;
    generate, with a third neural network tuned to process vehicle dynamics and paths, a second path to park the vehicle based on the first path, vehicle dynamics information and at least one historical path stored in vehicle memory; and
    provide commands to control the vehicle to follow the second path to park the vehicle in the parking zone.

2. The system of claim 1, comprising the data processing system to:
    detect, from the first neural network and based on the data sensed by the first one or more sensors, objects located at the parking zone;
    perform, from the first neural network and based on the data sensed by the first one or more sensors, scene segmentation;
    determine, from the first neural network and based on the data sensed by the first one or more sensors, depth information for the parking zone; and
    identify, from the first neural network and based on the data sensed by the first one or more sensors, one or more parking lines at the parking zone; and
    construct the digital map data structure based on the detected objects located at the parking zone, the scene segmentation, the depth information for the parking zone, and the one or more parking lines at the parking zone.

3. The system of claim 1, comprising the data processing system to:
    establish the parking zone using location information from a satellite based global positioning system.

4. The system of claim 1, comprising the data processing system to:
    generate, from the first neural network and based on the data sensed by the first one or more sensors, the digital map data structure comprising a three-dimensional dynamic map; and
    display the three-dimensional dynamic map via a display device coupled to the vehicle.

5. The system of claim 1, comprising the data processing system to:
    generate the digital map data structure, the first path, and the second path in an absence of location information from a satellite based global position system.

6. The system of claim 1, comprising the data processing system to:
    detect a second vehicle located in the parking zone;
    establish a secure communication channel with the second vehicle;
    request, from the second vehicle via the secure communication channel, map information for the parking zone; and
    receive, from the second vehicle responsive to the request, map information for the parking zone stored in memory of the second vehicle.

7. The system of claim 1, comprising the data processing system to:
    prior to generation of the first path, request, from a second vehicle located in the parking zone, map information for the parking zone;
    receive, responsive to the request, the map information from the second vehicle; and
    input the map information into the second neural network to generate the first path.

8. The system of claim 1, comprising the data processing system to:
    determine, from a fourth neural network, the commands to control the vehicle to follow the second path.

9. The system of claim 1, comprising:
    the data processing system to receive the data from the first one or more sensors comprising at least one of a radar, light detection and ranging sensor ("LIDAR"), ultrasonic transducer, camera, and infrared sensor.

10. The system of claim 1, wherein the first neural network comprises a plurality of sub-neural networks, the system comprising the data processing system to:

tune, based on historical data, the plurality of sub-neural networks of the first neural network to generate the digital map data structures;

generate, from a first sub-neural network of the plurality of sub-neural networks, object detection information;

generate, from a second sub-neural network of the plurality of sub-neural networks, scene segmentation information;

generate, from a third sub-neural network of the plurality of sub-neural networks, depth information; and generate, from a fourth sub-neural network of the plurality of sub-neural networks, parking line information.

11. The system of claim 10, comprising:

construct the digital map data structure based on the object detection information, the scene segmentation information, the depth information, and the parking line information.

12. The system of claim 1, comprising:

the data processing system to tune, based on historical data, the second neural network to generate the paths, the paths comprising paths for parking vehicles.

13. The system of claim 1, comprising:

the data processing system to tune, based on historical data, the third neural network to generate second paths for parking vehicles based on vehicle dynamics and historical paths.

14. The system of claim 1, comprising the data processing system to:

determine that the data from the first one or more sensors is insufficient to generate the digital map data structure for input into the second neural network to generate the first path;

generate commands to control the vehicle to traverse a preliminary path within the parking zone to collect additional data about the parking zone from the first one or more sensors; and input the additional data to the first neural network to generate the first path.

15. The system of claim 1, wherein at least one of the first neural network, the second neural network and the third neural network comprises a convolution neural network.

16. A method of network-based path generation for a vehicle controller, comprising:

receiving, by a data processing system comprising one or more processors and memory, data sensed by a first one or more sensors mounted on a vehicle located at a parking zone;

generating, by the data processing system from a first neural network, a digital map data structure based on the data sensed by the first one or more sensors;

generating, by the data processing system from a second neural network, a first path based on the digital map data structure;

receiving, by the data processing system, vehicle dynamics information from a second one or more sensors located on the vehicle;

generating, by the data processing system with a third neural network, a second path to park the vehicle based on the first path, vehicle dynamics information and at least one historical path stored in vehicle memory; and providing, by the data processing system, commands to control the vehicle to follow the second path to park the vehicle in the parking zone.

17. The method of claim 16, comprising:

detecting, from the first neural network and based on the data sensed by the first one or more sensors, objects located at the parking zone;

performing, from the first neural network and based on the data sensed by the first one or more sensors, scene segmentation;

determining, from the first neural network and based on the data sensed by the first one or more sensors, depth information for the parking zone; and identifying, from the first neural network and based on the data sensed by the first one or more sensors, one or more parking lines at the parking zone; and constructing the digital map data structure based on the detected objects located at the parking zone, the scene segmentation, the depth information for the parking zone, and the one or more parking lines at the parking zone.

18. The method of claim 16, comprising:

establishing the parking zone using location information from a satellite based global positioning system.

19. The method of claim 16, comprising:

generating, from the first neural network and based on the data sensed by the first one or more sensors, the digital map data structure comprising a three-dimensional dynamic map; and displaying the three-dimensional dynamic map via a display device coupled to the vehicle.

20. The method of claim 16, comprising:

generating the digital map data structure, the first path, and the second path in an absence of location information from a satellite based global position system.

* * * * *